United States Patent [19]

Togai et al.

[11] Patent Number: 5,018,383
[45] Date of Patent: May 28, 1991

[54] FAILURE DIAGNOSTIC APPARATUS IN AN ENGINE AIR INTAKE SYSTEM

[75] Inventors: Kazuhide Togai, Takatsuki; Yoshiaki Danno, Kyoto; Masato Yoshida, Kyoto; Makoto Shimada, Kyoto; Katsunori Ueda, Kyoto, all of Japan

[73] Assignee: Mitsubishi Jidosha Kogyo Kabushiki Kaisha, Tokyo, Japan

[21] Appl. No.: 505,445

[22] Filed: Apr. 9, 1990

[30] Foreign Application Priority Data

Apr. 7, 1989 [JP] Japan ................................. 1-88740

[51] Int. Cl.$^5$ ........................................... G01M 15/00
[52] U.S. Cl. .................................. 73/118.1; 180/197
[58] Field of Search ................ 73/118.2, 117.3, 118.1; 364/424.03; 180/197

[56] References Cited

U.S. PATENT DOCUMENTS 4,903,526 2/1990 Miyama et al. .................... 73/117.3

Primary Examiner—Jerry W. Myracle
Attorney, Agent, or Firm—Wegner, Cantor Mueller & Player

[57] ABSTRACT

A failure diagnostic apparatus in an engine intake system is provided comprising a throttle valve arranged in an intake path of the engine, a detecting unit detecting an opening of the throttle valve, a detecting unit detecting an air amount passing through the intake pipe, a detecting unit detecting an output torque of the engine, an estimating unit estimating an air amount passing through the throttle valve on the basis of the opening of the throttle valve, an estimating unit estimating an air amount on the basis of the output torque, a correction unit adding time delay correction to the output data of the air amounts, and a failure judging circuitry comparing the three air amount provided by the respective unit, thereby making a judgement of a failure on any one of the detecting units.

6 Claims, 17 Drawing Sheets

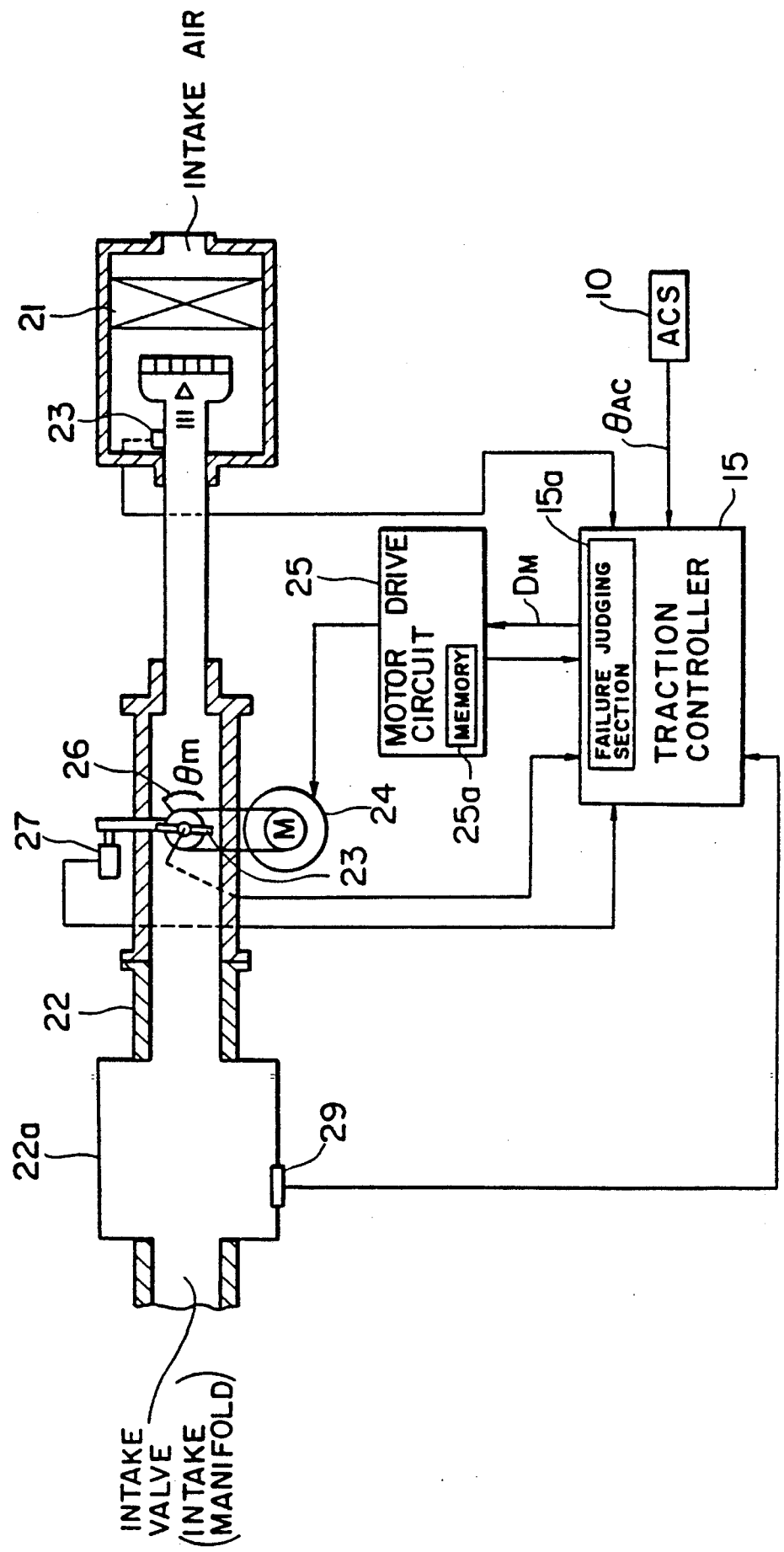

| | ENGINE SPEED Ne | | | |
|---|---|---|---|---|
| TARGET ENGINE TORQUE Tel | A/No | | | |
| | | | | |
| | | | | |

|  | ENGINE SPEED Ne |
|---|---|
| TARGET A/No | $\theta mo'$ |

FAILURE DIAGNOSTIC APPARATUS IN AN ENGINE AIR INTAKE SYSTEM

BACKGROUND OF THE INVENTION

1. Field of the Invention

This invention relates to a failure diagnostic apparatus in an engine air intake system for judging a failure of an air flow sensor adopted for detecting an intake air amount in the engine air intake system, which controls the intake air amount by opening and closing a throttle valve arranged in an intake pipe of an engine for a vehicle.

2. Description of the Prior Art

It is known that engine output control in a vehicle is performed by opening and closing a throttle valve disposed in an intake pipe for changing an intake air amount or a fuel amount for a cylinder.

There have been provided two types of throttle valve system in the air intake pipe for practical application. One is a mechanical throttle system where the throttle valve is opened and closed in association with a depressing operation of an accelerator pedal. The other is an electrically powered throttle system where a target throttle opening is set on the basis of a depressed amount of the accelerator pedal and the opening and closing operation of the throttle valve is automatically controlled according to the target throttle opening. The electrically powered throttle system is provided with a throttle opening sensor for detecting a throttle opening of the throttle valve. In the electrically powered throttle system, a deviation between a throttle opening actually detected by the throttle opening sensor and the target throttle opening is determined. An electrically powered actuator is controlled so that the deviation becomes "0", thereby adjusting the throttle opening to the target throttle opening.

In this case, the throttle opening sensor lacks high reliability, as being of a contact type. If the throttle opening sensor is in trouble, a feedback control is incapable because the actual throttle opening for the target throttle opening becomes unavailable.

Therefore, it is proposed that the intake air amount of the intake pipe, which is changed by controlling the throttle opening, is detected by an air flow sensor of a non-contact type having a high reliability and the throttle valve is controlled so that the intake air amount detected by the air flow sensor is coincided with the target intake air amount.

The air flow sensor should be monitorred whether it works normally, as being employed as an important means for detecting an engine condition because of its high reliability.

There has been proposed a judging means for judging a failure of the air flow sensor, which is useful in the event that no output signal is available from the air flow sensor although the engine is in operating state.

However, since the failure judging means above described judges only whether an output signal is output from the air flow sensor, the failure judgement cannot be made in the intermediate state on the intake air amount which changes during travelling state.

SUMMARY OF THE INVENTION

It is an object of the present invention to provide a failure diagnostic apparatus in an engine air intake system which enables not only detection of presence of an output signal from an air flow sensor during engine operating state but also detection of a failure of the air flow sensor having high reliability.

According to the present invention, there is provided a failure diagnostic apparatus in an engine intake system, which comprises a throttle valve arranged in an intake path of an intake pipe of an engine for controlling an intake air amount by opening and closing a valve thereof, throttle opening detecting means for detecting an opening of the throttle valve, intake air amount detecting means for detecting a first intake air amount passing through the intake pipe, engine torque detecting means for detecting an output torque of the engine, first air amount estimating means for estimating a second intake air amount passing through the intake pipe on the basis of the opening of the throttle valve detected by the throttle opening detecting means, second air amount estimating means for estimating a third intake air amount passing through the intake pipe on the basis of the output torque of the engine detected by the engine torque detecting means, correction means for adding a correction of time delay occurring upon detection of the output torque of the engine to the first intake air amount detected by the intake air amount detecting means and the second intake air amount estimated by the first air amount estimating means, respectively, and failure judging means for comparing the first intake air amount added the correction by the correction means, the second intake air amount added the correction by the correction means, and the third intake air amount estimated by the second amount estimating means, thereby judging a failure in any one of the intake air amount detecting means, the throttle opening detecting means and the engine torque detecting means.

An advantage of this invention is to provide a failure diagnostic apparatus in an engine air intake system which enables not only detection of presence of an output signal from an air flow sensor during engine operating state but also detection of a failure of the air flow sensor having high reliability.

BRIEF DESCRIPTION OF THE INVENTION

FIG. 1(B) is a block diagram showing the arrangement of an intake air system of an engine shown in FIG. 1(A);

DETAILED DESCRIPTION OF THE PREFERRED EMBODIMENT

The present invention will now be described with reference to the accompanying drawings when adopted to an acceleration slip preventing apparatus for a vehicle.

Figure 1A:
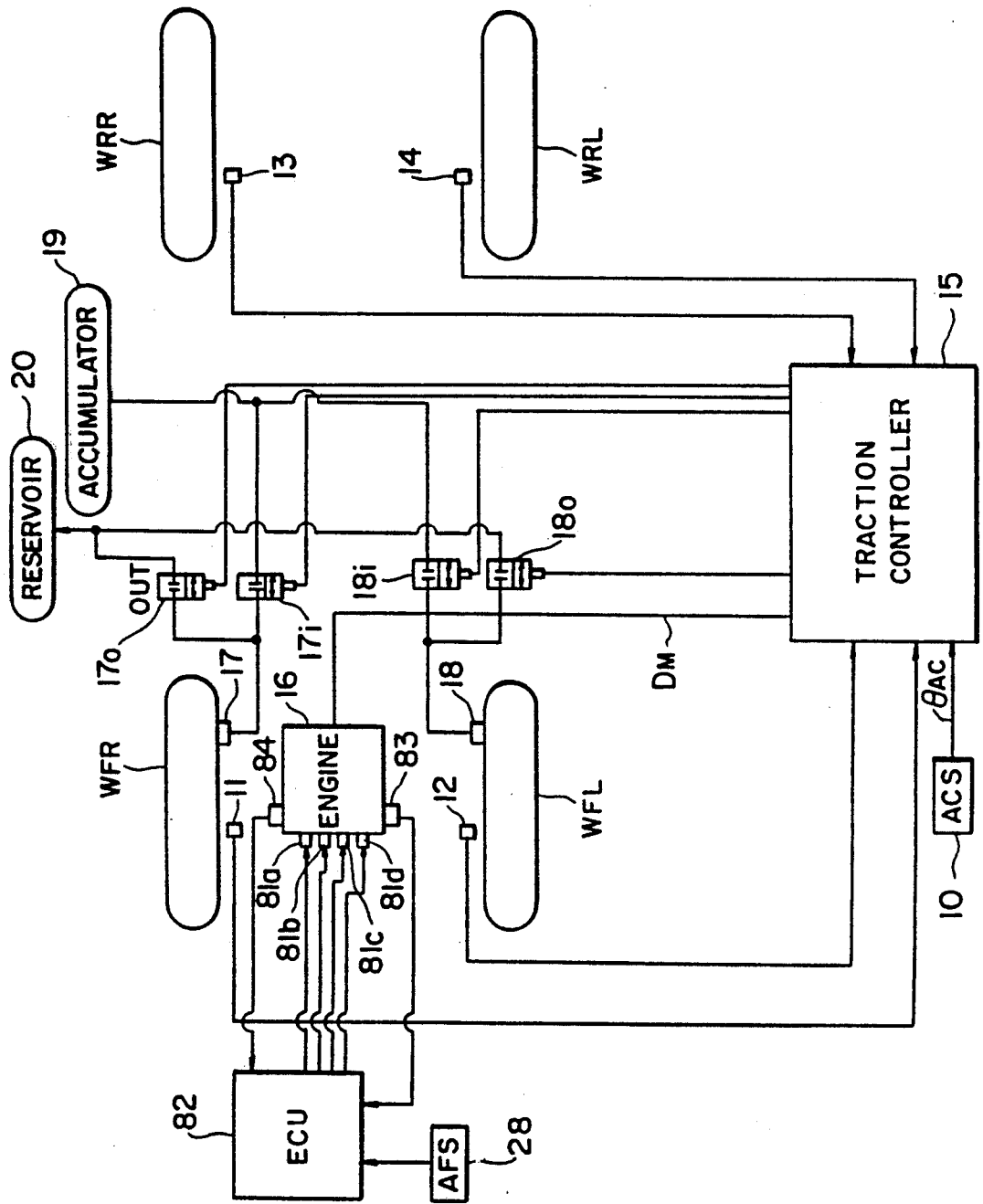
FIG. 1(A) is a block diagram showing the overall arrangement of a slip preventing apparatus to which a failure diagnostic apparatus in an engine air intake system according to the embodiment of the present invention is applied.

FIG. 1(A) is a block diagram showing an acceleration slip preventing apparatus for a vehicle.

FIG. 1(A) exemplifies a front-drive vehicle, and reference symbol WFR denotes a front right wheel; WFL, a front left wheel; WRR, a rear right wheel; and WRL, a rear left wheel. Reference numeral 10 denotes an accelerator position sensor which detects an opening of an accelerator pedal when the accelerator pedal is depressed. The accelerator opening θAC detected by the accelerator position sensor 10 is input to a traction controller 15. Reference numeral 11 denotes a wheel velocity sensor for detecting a wheel velocity VFR of the front right wheel (driving wheel) WFR; 12, a wheel velocity sensor for detecting a wheel velocity VFL of the front left wheel (driving wheel) WFL; 13, a wheel velocity sensor for detecting a wheel velocity VRR of the rear right wheel (driven wheel) WRR; and 14, a wheel velocity sensor for detecting a wheel velocity VRL of the rear left wheel (driven wheel) WRL. The wheel velocities VFR, VFL, VRR and VRL detected by the wheel velocity sensors 11, 12, 13, and 14, respectively are input to the traction controller 15. The traction controller 15 sends a control signal to an engine 16 to control an engine output for preventing a slip of the driving wheels in an acceleration state.

FIG. 1(B) exemplifies an air intake system for the engine 16. Reference numeral 21 denotes an air cleaner; 22, an intake pipe; and 22a, a surge tank. The intake pipe 22 is provided with a throttle valve ($TH_m$) 23 therein, of which opening $\theta_m$ is controlled by a control signal $D_M$ from the traction controller 15. Intake air introduced through the air cleaner 21 is led to the side of an intake valve from the surge tank 22a through the throttle valve ($TH_m$) 23. The opening $\theta_m$ of the throttle valve ($TH_m$) is controlled by an opening signal supplied from the traction controller 15, thereby controlling a driving force of the engine 16 by controlling a motor driving circuit 25 and a motor 24 thereof. A stepper motor which rotates a predetermined angle every one step is, for example, employed as the motor 24 in this embodiment. A step datum of the stepper motor corresponding to the operating angle of the stepper motor is stored at real time in a memory 25a of the motor driving circuit 25. When the motor 24 is rotated, the throttle valve ($TH_m$) is rotated in the opening direction to cause the step datum to be changed to the positive (+) direction. Conversely, the motor 24 is reversely rotated, the throttle valve ($TH_m$) is rotated in the closing direction to cause the step datum to be changed to the negative (−) direction. The opening $\theta_m$ of the throttle valve ($TH_m$) is detected by a throttle position sensor (TPS) 26. The throttle valve ($TH_m$) is provided with a throttle idle switch 27 which detects the idling state of the engine 16. An air flow sensor (AFS) 28 is provided in the downstream of the air cleaner 21 for detecting an intake air amount per engine revolution cycle. The surge tank 22a is provided with a negative pressure sensor 29 which detects a negative pressure (a boost pressure) in the pipe when the fuel-air mixture gas is introduced from the intake manifold to a combustion chamber. Output signals output from the throttle position sensor 26, the air flow sensor 28, the negative pressure sensor 29 and the throttle idle switch 27 are supplied to the traction controller 15.

In FIG. 1(A), reference numeral 17 denotes a wheel cylinder for braking the front right wheel WFR; and 18, a wheel cylinder for braking the front left wheel WFL. A pressurized oil is supplied to these wheel cylinders through a master cylinder and the like (not shown) by operating a brake pedal (not shown). During a traction control operation, the pressurized oil can be supplied via another path, as will be described below. The pressurized oil is supplied from an accumulator 19 to the wheel cylinder 17 through an inlet valve 17i, and is exhausted from the wheel cylinder 17 to a reservoir 20 through an outlet valve 17o. The pressurized oil is also supplied from the accumulator 19 to the wheel cylinder 18 through an inlet valve 18i, and is exhausted from the wheel cylinder 18 to the reservoir 20 through an outlet valve 18o. The inlet valves 17i and 18i, and the outlet valves 17o and 18o are opening/closing-controlled by the traction controller 15.

The slip preventing control performed by controlling a driving force of the engine 16 and by controlling braking of the driving wheels WFR and WFL is started when slip values of these driving wheels WFR and WFL exceed a predetermined slip judging value α, and is finished when the slip values of the driving wheels become smaller than the predetermined slip judging value α.

In FIG. 1(A), reference numerals 81a, 81b, 81c and 81d denote fuel injectors. An operating time of the injectors 81a, 81b, 81c, and 81d, i.e., a fuel amount, is set by an engine control unit (ECU) 82 corresponding to an intake air amount on the basis of a signal from the air flow sensor (AFS) 28. Reference numeral 83 denotes an engine speed sensor for detecting rotation of a crank shaft and reference numeral 84 denotes an engine torque sensor for detecting output torque of the engine 16. An engine speed detecting signal and an engine torque detecting signal detected by the engine speed sensor and the engine torque sensor, respectively, are output to the engine control unit (ECU) 82. Incidentally, the traction controller may be formed integrally with the engine control unit (ECU) 82.

The detailed arrangement of the traction controller 15 will be described hereinafter with reference to FIG. 2.

Figure 2:
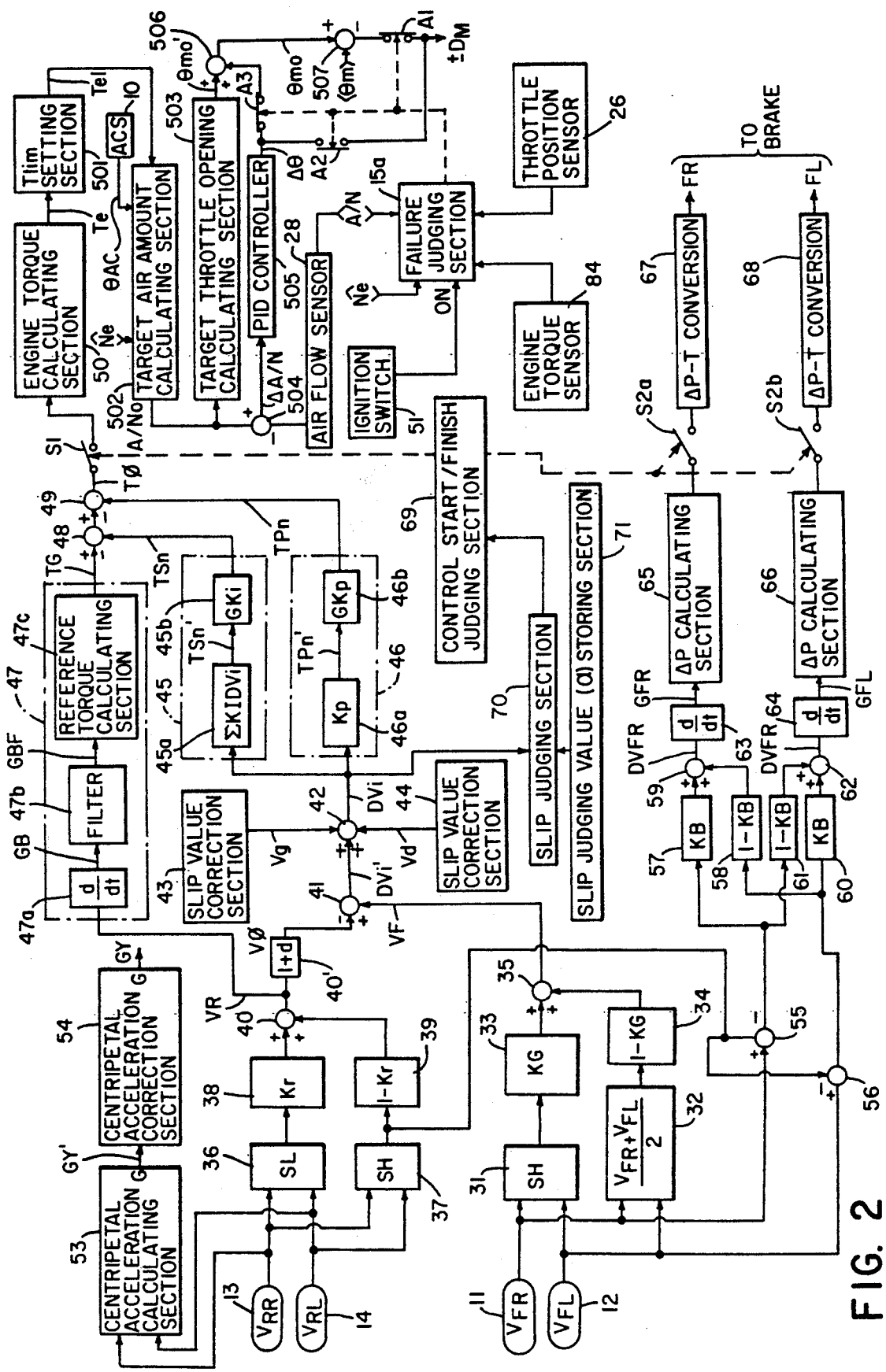
FIG. 2 is a block diagram showing the control of a traction controller shown in FIGS. 1(A) and 1(B), dividing it into blocks according to its function.

In FIG. 2, reference numeral 11 denotes the wheel velocity sensor for detecting the wheel velocity VFR of the front right driving wheel WFR; 12, a wheel velocity sensor for detecting a wheel velocity VFL of the front left driving wheel WFL. The driving wheel velocities VFR and VFL both are sent to a higher-velocity selector 31 and an averaging section 32. The higher-velocity selector 31 selects a higher one between the wheel velocities of the driving wheels VFR, VFL to output it to a weighting section 33. The averaging section 32 receives from the wheel velocity sensors 11 and 12 driving wheel velocities VFR and VFL detected thereby to calculate an average driving wheel velocity [(VFR+VFL)/2]. The average driving wheel velocity calculated by the averaging section 32 is output to a weighting section 34. The higher wheel velocity of the driving wheels WFR, WFL selected by and output from the higher-velocity selector 31 is multiplied by KG (a variable) by the weighting section 33. The average driving wheel velocity averaged by and output from the averaging section 32 is multiplied by $(1-KG)$ (a variable) by the weighting section 34. The driving wheel velocity and the average driving wheel velocity weighted by the weighting sections 33 and 34 are supplied to an adder 35 to be added each other, thereby calculating a driving wheel velocity VF.

Figure 3:
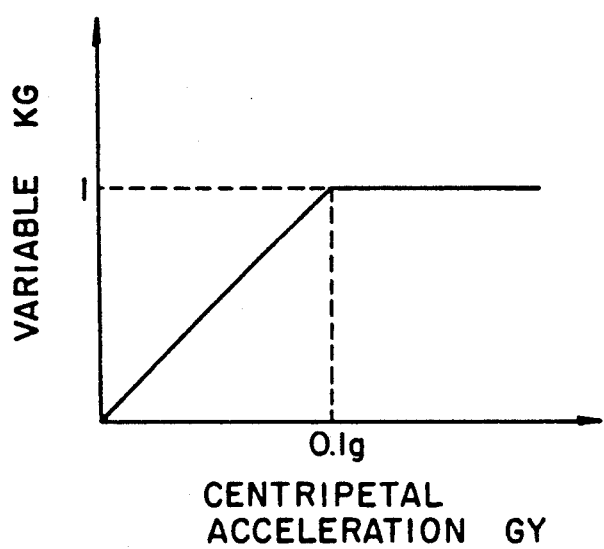
FIG. 3 is a graph showing the relationship between a centripetal acceleration GY and a variable KG.

As shown in FIG. 3, the variable KG is proportional to a centripetal acceleration GY up to a predetermined value of the centripetal acceleration (e.g., 0.1 g: g is a gravitational acceleration), and becomes "1" when the centripetal acceleration exceeds the predetermined value.

On the other hand, the driven wheel velocities VRR and VRL detected by wheel velocity sensors 13 and 14, respectively, are both sent to a lower-velocity selector 36 and a higher-velocity selector 37. The lower-velocity selector 36 selects a lower one between the driven wheel velocities VRR and VRL, and the higher-velocity selector 37 selects a higher one between the driven wheel velocities VRR and VRL. The lower driven wheel velocity selected by the lower-velocity selector 36 is output to the weighting section 38, and the higher driven wheel velocity selected by the higher-velocity selector 37 is output to the weighting section 39. The weighting section 38 multiplies the higher one between the driven wheel velocities of the driven wheels WRR and WRL selected by and output from the lower-velocity selector 36 by Kr (a variable). The weighting section 39 multiplies the higher one between the wheel velocities of the driven wheels WRR and WRL selected by and output from the higher-velocity selector 37 by $(1-Kr)$ (a variable). The driven wheel velocities weighted by the weighting sections 38 and 39 are supplied to an adder 40 to be added each other, thereby calculating a driven wheel velocity VR. The driven wheel velocity VE calculated by the adder 40 is output to a multiplier 40'. The multiplier 40' multiplies the thus-calculated driven wheel velocity VR by $(1+\alpha)$, thereby calculating a target driving wheel velocity $V\phi$ on the basis of the driven wheel velocities VRR and VRL.

Figure 4:
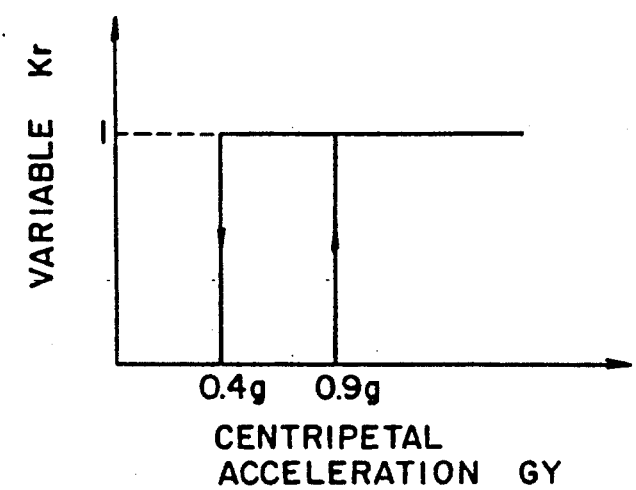
FIG. 4 is a graph showing the relationship between the centripetal acceleration GY and a variable Kr.

As shown in FIG. 4, the Kr is a variable which changes corresponding to the centripetal acceleration GY between "1" and "0".

The driving wheel velocity VF calculated by the adder 35 and the target driving wheel velocity $V\phi$ calculated by the multiplier 40' are supplied to a subtractor 41. The subtractor 41 subtracts the target driving wheel velocity $V\phi$ from the driving wheel velocity VF to calculate a slip value $DVi'$ $(=VF-V\phi)$ of the driving wheels WFR and WFL. The slip value $DVi'$ calculated by the subtractor 41 is supplied to an adder 42 which corrects the slip value $DVi'$ in accordance with the centripetal acceleration GY and its change rate $\Delta GY$. A slip correction value $V_g$ shown in FIG. 5 changing corresponding to the centripetal acceleration GY is supplied to the adder 42 from a slip correction section 43 and a slip correction value Vd shown in FIG. 6 changing corresponding to the change rate $\Delta GY$ of the centripetal acceleration GY is supplied to the adder 42 from a slip correction section 44. More specifically, the adder 42 adds the slip correction values $V_g$ and $V_d$ to the slip value $DVi'$ supplied from the subtractor 41 so that the slip value DVi corrected corresponding to the centripetal acceleration GY and its change rate $\Delta GY$ is sent to a $TS_n$ calculating unit 45 and a $TP_n$ calculating unit 46, for example, every 15-ms sampling time T.

The slip value $DV_i$ is sent to a calculating section 45a of a $TS_n$ calculating unit 45. The slip value DVi is integrated by the calculating section 45a while being multiplied by a coefficient KI, thereby calculating an integral correction torque $TS_n'$ $(=\Sigma KI \cdot DV_i)$. Thus-determined integral correction torque $TS_n'$ is sent to a coefficient multiplier 45b. That is, the integral correction torque $TS_n'$ is a correction value for a torque for driving the driving wheels WFR and WFL, of which control gain needs to be adjusted in accordance with a change in characteristics of a power transmission mechanism between the engine 16 and the driving wheels WFR and WFL. The coefficient multiplier 45b multiplies the integral correction torque $TS_n'$ determined by the calculating section 45a by a coefficient $GK_i$ which differs in accordance with a transmission range, thereby calculating an integral correction torque $TS_n$ corresponding to the transmission range. Here, the variable KI is a coefficient which changes according to the slip value $DV_i$.

On the other hand, the slip value $DV_i$ is also sent to a calculating section 46a of a $TP_n$ calculating unit 46 which calculates a proportional correction torque $TP_n'$ $(=DV_i \cdot K_p)$ by multiplying the slip value $DV_i$ by a coefficient $K_p$. Thus-calculated proportional correction torque $TP_n'$ is then sent to a coefficient multiplier 46b. That is, the proportional correction torque $TP_n'$ is a correction value for a torque for driving the driving wheels WFR and WFL, same as the integral correction torque $TS_n'$, of which control gain needs to be adjusted in accordance with a change in characteristics of a power transmission mechanism between the engine 16 and the driving wheels WFR and WFL. The coefficient multiplier 46b multiplies the proportional correction torque $TS_n'$ supplied from the calculating section 46a by a coefficient $GK_p$ which differs in accordance with a transmission range, thereby calculating a proportional correction torque $TP_n$ corresponding to the transmission range.

The driven wheel velocity VR determined by the adder 40 is also sent to a reference torque calculating unit 47 as a vehicle velocity VB. An acceleration GB of the vehicle acceleration VB is calculated by a vehicle acceleration calculating section 47a of the reference calculating section 47 to be sent as a vehicle acceleration GBF to a reference torque calculating section 47c through a filter 47b. The reference torque calculating section 47c calculates a reference torque TG ($=GBF \times W \times R_e$) on the basis of the vehicle acceleration GBF, a body weight W of the vehicle and a wheel radius $R_e$. Thus-calculated reference torque TG becomes a torque value which should be output from the engine 16 when the vehicle is accelerated at the vehicle acceleration GBF.

The filter 47b determines which preceding value of the vehicle accelerations GB in relation with time should be used upon calculating the reference torque TG by the reference torque calculating section 47c, for example, dividing the duration of the acceleration state of the vehicle into three stages. That is, a vehicle acceleration GBF filtered through the filter 47b is calculated on the basis of a vehicle acceleration $GB_n$ presently detected and a vehicle acceleration $GBF_{n-1}$ which is an immediately preceding output value obtained through the filter 47b in accordance with a present slip rate S and an acceleration condition of the vehicle.

Figure 15:
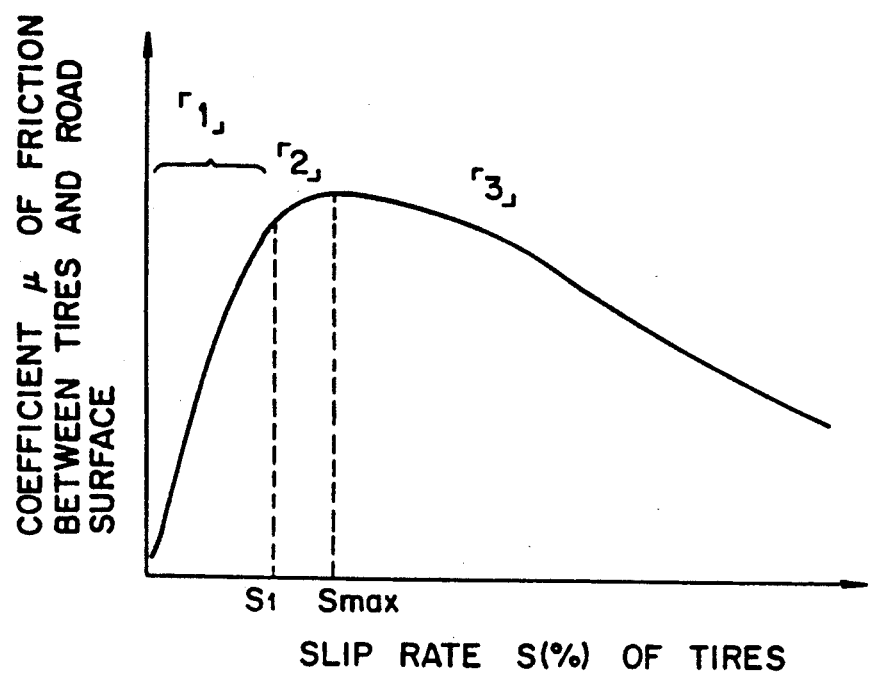
FIGS. 15 and 18 are graphs showing the relationship between a slip rate S and a coefficient μ of friction of a road surface.

For instance, when the present acceleration of the vehicle is increasing and its slip rate S falls into range "1" of a state shown in FIG. 15, the slip rate S should be quickly shifted to fall into range "2". Accordingly, the filter 47b averages the immediately preceding vehicle acceleration $GBF_{n-1}$ output from the filter 47b and the presently detected vehicle acceleration $GB_n$ with the same weight, thereby calculating a vehicle acceleration GBF as a latest vehicle acceleration $GBF_n$ by equation (1):

$$GBF_n = (GB_n + GBF_{n-1})/2 \quad (1)$$

When the present acceleration of the vehicle is decreasing and its slip rate S satisfies S>S1 and shifted from range "2" to "3" shown in FIG. 15, in order to maintain the condition in range "2" as long as possible, the immediately preceding vehicle acceleration $GBF_{n-1}$ output from the filter 47b is weighted so that the vehicle acceleration GBF is calculated as the latest vehicle acceleration $GBF_n$ having a value closer to the immediately preceding vehicle acceleration $GBF_{n-1}$ calculated immediately before than a value calculated by equation (1), by using equation (2):

$$GBF_n = (GB_n + 7GBF_{n-1})/8 \quad (2)$$

Furthermore, when the present acceleration of the vehicle is decreasing and its slip rate S satisfies S≦S1 and is shifted from range "2" to "1" shown in FIG. 15, in order to return the condition to range "2" as much as possible, the immediately preceding vehicle acceleration $GBF_{n-1}$ output from the filter 47b is further weighted so that the vehicle acceleration GBF is calculated as the latest vehicle acceleration $GBF_n$ having a value closer to the immediately preceding vehicle acceleration $GBF_{n-1}$ than a value calculated by equation (2), by using equation (3):

$$GBF_n = (GB_n + 15GBF_{n-1})/16 \quad (3)$$

A reference torque TG calculated by the reference torque calculating unit 47 is sent to a subtractor 48. The subtractor 48 subtracts the integral correction torque $TS_n$ calculated by the $TS_n$ calculating unit 45 from the reference torque TG calculated by the reference calculating unit 47. Thus-subtracted datum is further supplied to a subtractor 49. The subtractor 49 further subtracts the proportional correction torque $TP_n$ calculated by the $TP_n$ calculating section 46 from the datum supplied from the subtractor 48. The datum subtracted by the subtractor 49 is sent to an engine torque calculating section 50 via a switch S1 to calculate a target torque Tφ for driving the driving wheels WFR and WFL. The target torque Tφ is calculated by equation (4):

$$T\phi = TG - TS_n - TP_n \quad (4)$$

Figure 16:
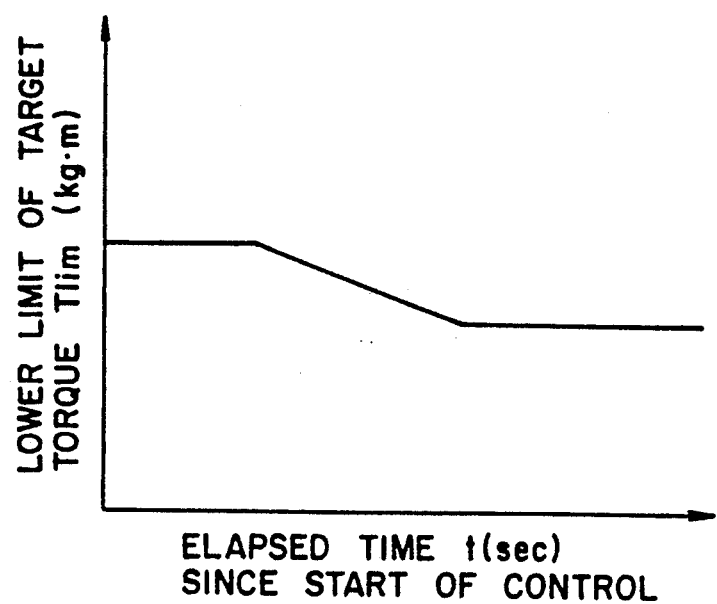
FIG. 16 is a graph showing $T_{lim}$-t characteristics.
Figure 17:
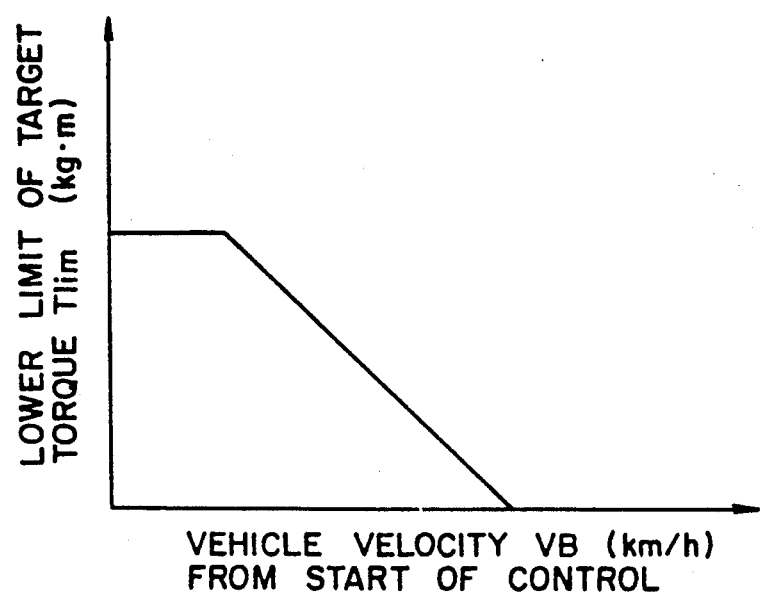
FIG. 17 is a graph showing $T_{lim}$-VB characteristics.

The engine torque calculating section 50 divides the target torque Tφ for the driving wheels WFR and WFL supplied via switch S1 from the subtractor 49 by a total gear ratio between the engine 16 and the drive axle to convert it to a target engine torque $T_e$. The target engine torque $T_e$ is sent to a lower limit setting section 501. The lower limit setting section 501 limits a lower value of the target engine torque $T_e$ calculated by the engine torque calculating section 50 to a lower limit $T_{lim}$ which changes as a function of elapsed time t from the beginning of traction control or the vehicle velocity VB, as shown in FIGS. 16 and 17, for example. A target engine torque $T_{el}$ of which lower value is limited by the lower limit setting section 501 is sent to a target air amount calculating section 502. The target air amount calculating section 502 calculates a target air amount $A/N_o$ per engine revolution cycle passing through the intake pipe 22 corresponding to an accelerator opening amount θAC supplied from an accelerator opening sensor (ACS) 10 and an engine speed $N_e$. The target air amount calculating section 502 also calculates another target air amount $A/N_o$ per engine revolution cycle passing through the intake pipe for outputting the target engine torque $T_{el}$ from the engine 16 on the basis of an engine speed $N_e$ referring to a three-dimentional map shown in FIG. 20, thereby selecting one between the two target air amounts $A/N_o$ to be output. The target air amount $A/N_o$ thus-obtained by the target air amount calculating section 502 is sent to a target throttle opening calculating section 503.

Figures 21, 22:
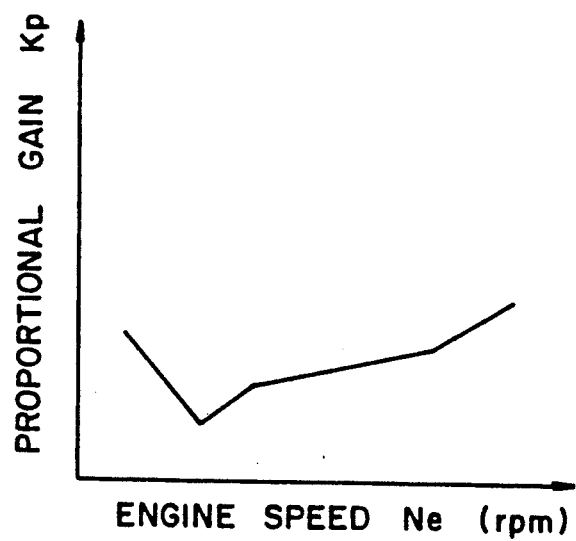
FIG. 21 shows a target engine torque-engine speed map used for determining a target throttle opening.
FIG. 22 is a graph showing a proportional gain Kp as a function of an engine speed.

The target air amount calculating section 502 selects a larger one between the target air amount $A/N_o$ corresponding to the target engine torque $T_{el}$ and the target air amount $A/N_o$ corresponding to the accelerator opening θAC during operation of normal engine control, i.e., non-operation of slip control. On the contrary, the target air amount calculating section 502 selects a smaller one between the two target air amounts $A/N_o$ during operation of slip control. Either one of the target air amounts $A/N_o$ corresponding to the target engine torque $T_{el}$ or the accelerator opening θAC, selected by the target air amount calculating section 502, is sent to the target throttle opening calculating section 503. The target throttle opening calculating section 503 determines a target throttle opening $\theta_{mo}'$ on the basis of the engine speed $N_e$ and the target air amount $A/N_o$, referring to a map shown in FIG. 21 for attaining the target air amount $A/N_o$.

The target air amount $A/N_o$ selected by and output from the target air amount calculating section 502 is also sent to a subtractor 504 to obtain a difference ΔA/N between the target air amount A/N$_o$ and an actual air amount per engine revolution cycle detected every predetermined sampling time by the air flow sensor 28. The deviation ΔA/N between the target air amount A/N$_o$ and the actual air amount A/N is sent to a PID controller 505 to calculate a throttle opening correction value Δθ of the throttle valve (TH$_m$) 23 corresponding to the air amount deviation ΔA/N.

The throttle opening correction value Δθ calculated by the PID controller 505 is next sent to an adder 506.

Figure 23:
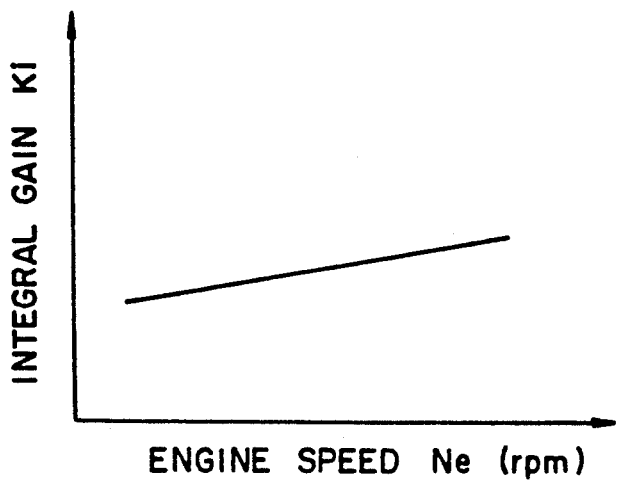
FIG. 23 is a graph showing an integral gain Ki as a function of an engine speed.
Figure 24:
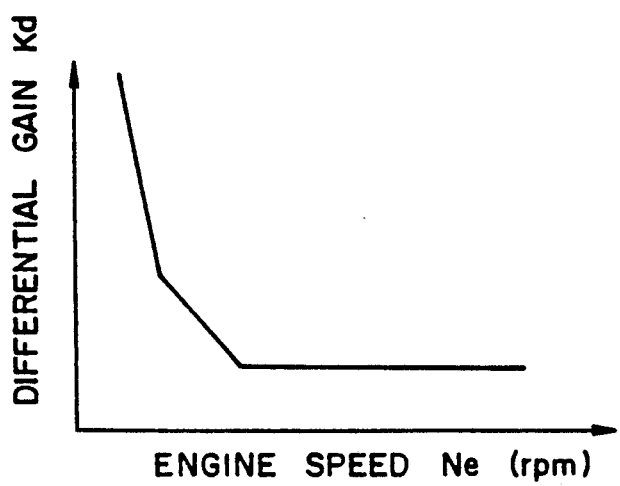
FIG. 24 is a graph showing a differential gain Kd as a function of an engine speed.
Figure 25:
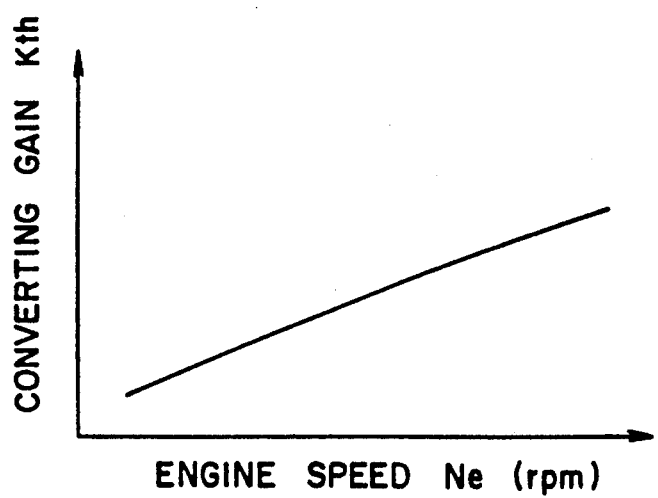
FIG. 25 is a graph showing a converting gain Kth as a function of an engine speed.

The throttle opening correction value Δθ determined by the PID controller 505 is a value as a result of addition of a throttle opening correction value Δθ$_p$ by proportional control, a throttle opening correction value Δθ$_i$ by integral control and a throttle opening correction value Δθ$_d$ by differential control as follows:

$$\Delta\theta = \Delta\theta_p + \Delta\theta_i + \Delta\theta_d$$

$$\Delta\theta_p = K_p(N_e) \cdot K_{th}(N_e) \cdot \Delta A/N$$

$$\Delta\theta_i = K_i(N_e) \cdot K_{th}(N_e) \cdot \Sigma(\Delta A/N)$$

$$\Delta\theta_d = K_d(N_e) \cdot K_{th}(N_e) \cdot \{\Delta A/N - \Delta A/N_{old}\}$$

where $K_p$, $K_i$ and $K_d$ are proportional (FIG. 22), integral (FIG. 23) and differential (FIG. 24) gains as a function of the engine speed $N_e$ as a parameter. $K_{th}$ is a ΔA/N→Δθ conversion gain (FIG. 25) as a function of the engine speed $N_e$, ΔA/N is a deviation between the target air amount A/N$_o$ and the actual air amount A/N, and ΔA/N$_{old}$ is ΔA/N obtained at the immediately preceding sampling timing.

The adder 506 adds the target throttle opening θ$_{mo}$' calculated by the target throttle opening calculating section 503 and the throttle opening correction value Δθ calculated by the PID controller 505 to calculate a feedback-corrected target throttle opening θ$_{mo}$. The feedback-corrected target throttle opening θ$_{mo}$ is sent to a subtractor 507 to calculate difference Δθ$_m$ between the target throttle opening θ$_{mo}$ and an actual throttle opening θ$_m$ detected every predetermined sampling time by the throttle position sensor 26. A motor driving signal D$_m$ corresponding to a motor driving amount corresponding to the throttle opening deviation Δθ$_m$ thus-obtained is sent via switch A1 to the motor driving circuit 25.

On the other hand, the motor driving signal D$_m$ corresponding to the motor driving amount corresponding to the throttle opening correction value Δθ calculated by the PID controller 505 is also sent via switch A2 to the motor driving circuit 25 while being sent via switch A3 to an adder 506.

The switches A1 to A3 are change-over switches of an interlocked type, whose changing operation is controlled by a failure judging section 15a. The failure judging section 15a judges whether any trouble is occuring in the air flow sensor 28, the throttle position sensor 26, or engine torque sensor 84 shown in FIGS. 1(A) and 1(B). The failure judging section 15a is supplied, including a key-on signal from an ignition switch SW51, a throttle opening detecting signal from the throttle position sensor 26, an engine output torque detecting signal from the engine torque sensor 84, an intake air amount detecting signal from the air flow sensor 28 and an engine speed detecting signal from the engine speed sensor 83.

Figure 26:
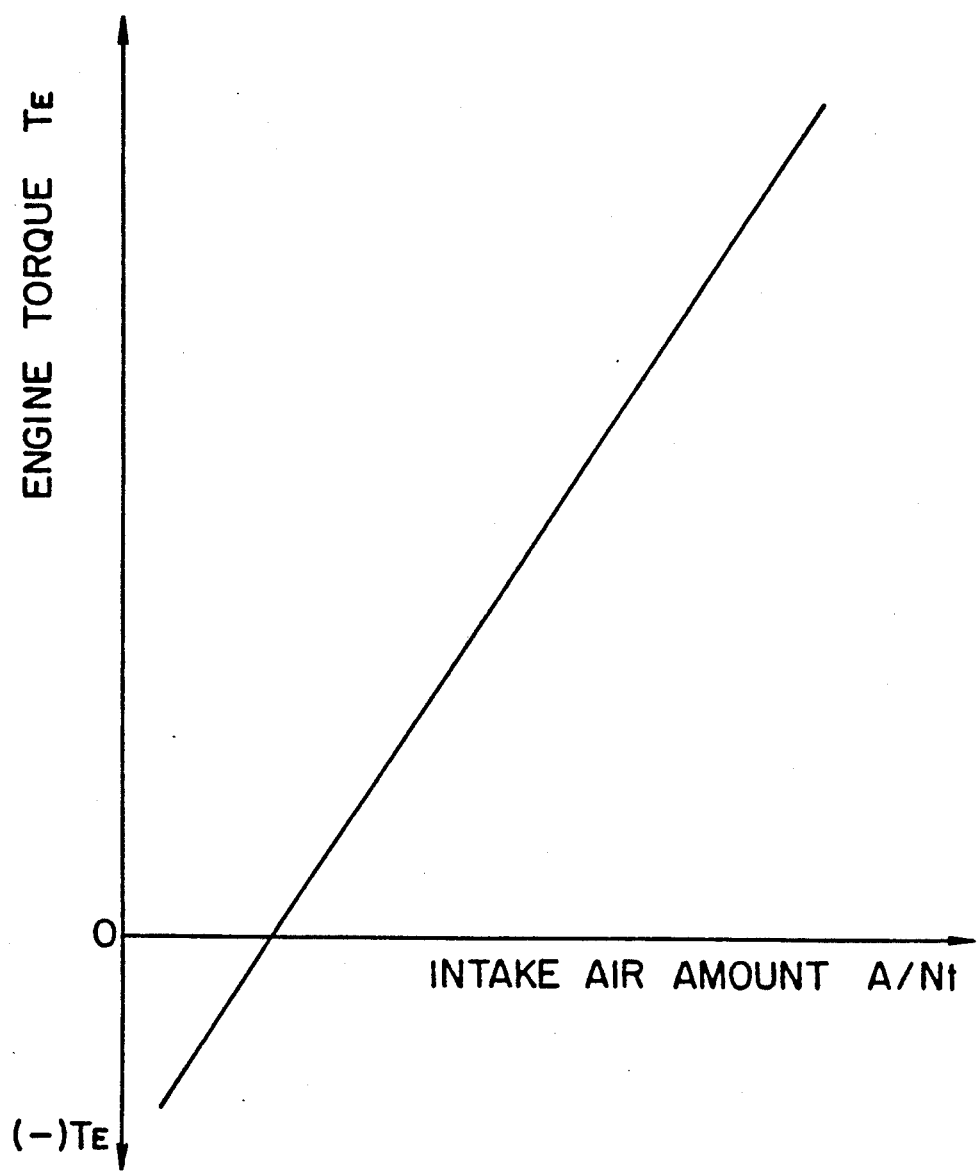
FIG. 26 is graph showing the relationship between an engine torque $T_E$ and an intake air amount $A/N_t$.
Figure 27:
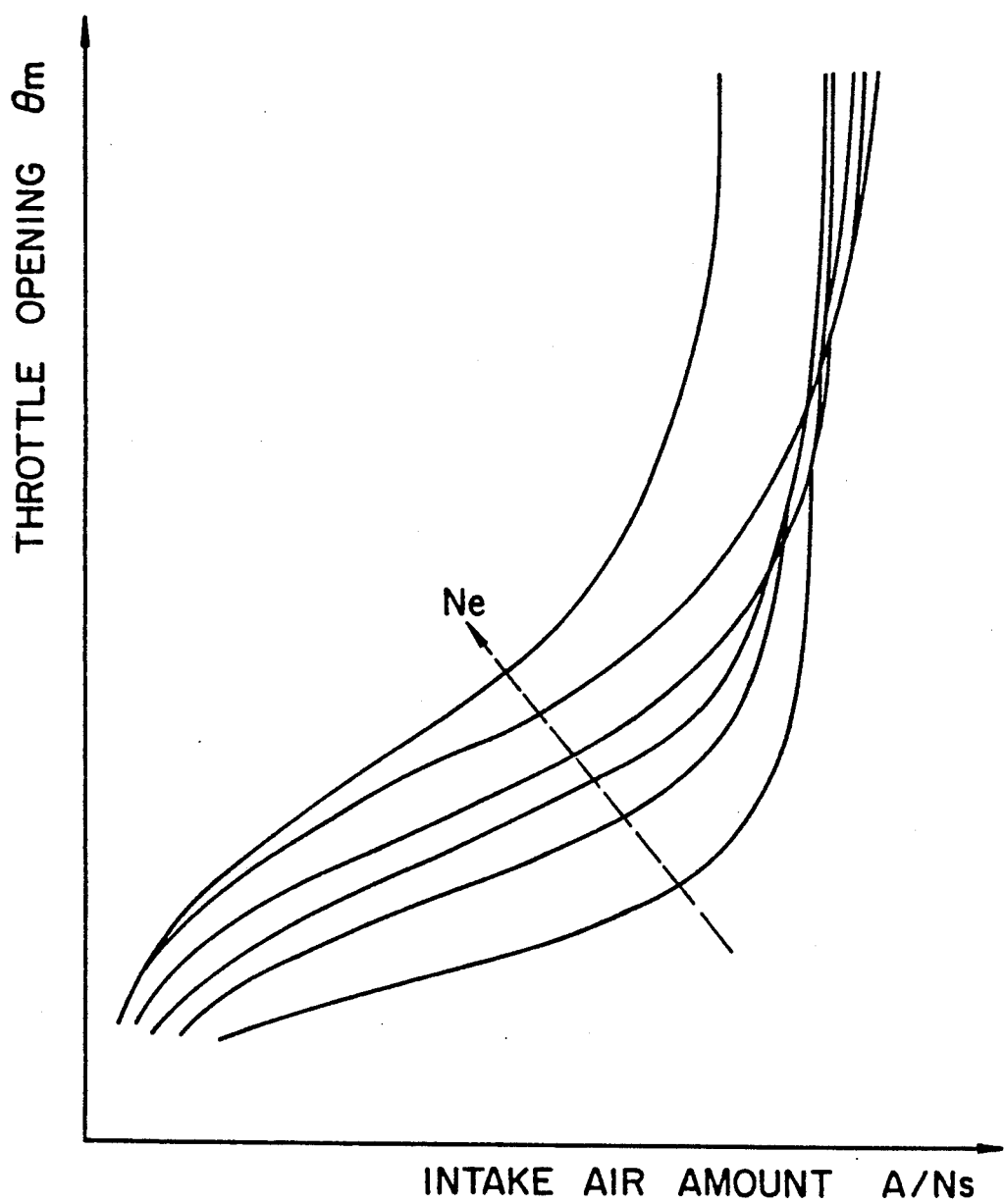
FIG. 27 is a graph showing the relationship between a throttle opening $\theta_m$ and an intake air amount $A/N_s$.

The failure judging section 15a compares three intake air amounts A/N, A/N$_t$ and A/N$_s$ obtained by three air amount judging means, i.e., an intake amount A/N per engine revolution cycle detected by the air flow sensor 28, an intake air amount A/N$_t$ estimated referring to a T$_E$−A/N$_t$ map shown in FIG. 26 on the basis of the engine output torque T$_E$ detected by the engine torque sensor 84 and an intake air amount A/N$_s$ estimated referring to a θ$_m$−A/N$_S$ map shown in FIG. 27 on the basis of the throttle opening θ$_m$ detected by the throttle position sensor 26. In this case, the intake air amount A/N detected by the air flow sensor 28 and the intake air amount A/N$_S$ estimated on the basis of the throttle opening θ$_m$ are subjected to time-delay correction in advance so as to be coincided with the detection time of the engine torque T$_E$.

Assuming that time-delay in the surge tank 22a of the air intake pipe 22 is primary-delay and time-delay produced in the engine cycle from "intake" to "expansion" is engine-stroke-delay, an intake air amount A/N$_{IN}$ is determined in consideration of the primary-delay by the following equation:

$$A/N_{IN} = (1-\alpha)A/N_{IN-1} + + \alpha A/N$$

where $\alpha$ is a value determined by a volume of the air intake pipe and a volume of the cylinder, which $\alpha$ becomes a constant in the case of computation of cycle synchronization. The presently calculated A/N$_{in}$ is used as A/N$_{IN-1}$ upon the following detection.

An intake air amount A/N$_{IN}$ obtained two stroke earlier may be used as the intake air amount A/N$_a$ when detecting the engine torque, taking in consideration of the primary-delay and the engine-stroke-delay, for a reason that time-delay corresponding to the two engine strokes of "intake" to "expansion" occurs at any time because time is elapsed until the inhaled air turns to an engine output.

On the other hand, the intake air amount A/N$_S$ obtained on the basis of the throttle opening θ$_m$ is also subjected to the primary-delay and engine-stroke-delay corrections by the same time-delay correction means as above described.

The failure judging section 15a compares three intake air amounts, i.e., intake air amounts A/N$_a$ and A/N$_S$ both subjected to time-delay correction, and an intake air amount A/N$_t$ calculated on the basis of the engine torque T$_E$, and if any one of these intake air amounts is removed from the other two besides exceeding a predetermined allowed value, an allowed value being determined on the basis of an allowable rate r (=30%) in this case, the failure judging section 15a judges that a trouble occurs in the one showing an abnormal value out of the intake air amount A/N$_a$ judging means, the intake air amount A/N$_S$ judging means and the intake air amount A/N$_t$ judging means, i.e., the air flow sensor 28, the throttle opening sensor 26 and the engine torque sensor 84. When one of the intake air amount judging means is decided to be in trouble by the failure judging section 15a, an abnormal flag which means a failure judgment is set. In this case, if the air flow sensor 28 is judged to be in trouble, an air flow sensor abnormal flag is set so that the switch A1 is switched to be closed, the switch A2 is switched to be opened and the switch A3 is switched to be opened. If the throttle position sensor 26 is judged to be in trouble, a throttle position sensor abnormal flag is set so that the switch A1 is switched to be opened and the switch A2 is switched to be closed.

That is, when the air flow sensor 28 is in an abnormal state, a motor driving signal $D_M$ is output from the substractor 507 via the switch A1 to the motor 24 in order to set a value of the throttle opening deviation $\Delta\theta_m$ at "0". When the throttle position sensor 26 is in an abnormal state, a motor driving signal $D_M$ is output from the PID controller 505 via the switch A2 to the motor 24 in order to set a value of the air amount deviation $\Delta A/N$ at "0", thereby controlling an opening $\theta_m$ of the throttle valve ($TH_m$) 23.

Incidentally, when the engine torque sensor 84 is judged to be in trouble, the control performed on the basis of an engine torque signal output from the engine torque sensor 84 is suspended.

Meanwhile, the wheel velocities VRR and VRL of the driven wheels WRR and WRL detected by the wheel velocity sensors 13 and 14, respectively, are sent to an centripetal acceleration calculating section 53 to determine a centripetal acceleration GY' for judging a degree of turning of the vehicle. The centripetal acceleration GY' is sent to a centripetal acceleration correction section 54 to be corrected in accordance with a vehicle speed, thereby determining a centripetal acceleration GY by the following equation:

$$GY = K_v GY'$$

where $K_v$ is a coefficient which changes according to a vehicle speed as shown in FIG. 7 to FIG. 12.

A larger driven wheel velocity output from the higher-velocity selector 37 is sent to a subtractor 55 to be subtracted from a vehicle velocity VFR of the right driving wheel WFR. A larger driven wheel velocity output from the higher-velocity selector 37 is sent to a subtractor 56 to be subtracted from a wheel velocity VFL of the left driving wheel WFL. The resulting value substracted by the subtractor 55 is output to a multiplier 57, and the resulting value subtracted by the subtractor 56 is output to a multiplier 58. The multiplier 57 multiplies the value output from the subtractor 55 by KB (0<KB<1), and the multiplier 58 multiplies the value output from the subtractor 56 by (1−KB). Thereafter, the two products are both sent to an adder 59 to be added each other, thereby obtaining a slip amount DVFR of the right driving wheel WFR.

On the other hand, the value subtracted by the substractor 56 is also sent to a multiplier 60, and the value subtracted by the subtractor 55 is also sent to a multiplier 61. The multiplier 60 multiplies the value output from the subtractor 56 by KB (0<KB<1), and the multiplier 61 multiplies the value output from the subtractor 55 by (1−KB). Thereafter, the two products are both sent to an adder 62 to be added each other, thereby obtaining a slip amount DVFL of the left driving wheel WFL.

Figure 13:
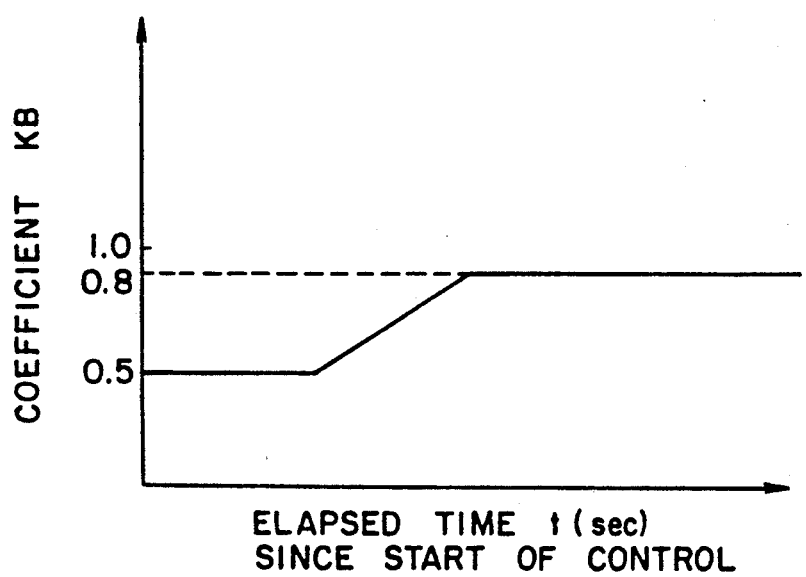
FIG. 13 is a graph showing a change in variable KB as a function of time from the beginning of brake control.

Here, the KG is a variable which changes according to an elapsed time t from the beginning of traction control, as shown in FIG. 13. At the beginning of the traction control, the variable KB is set to be "0", and approaches "0.8" as the traction control progresses. That is, if brakes of the left and right driving wheels are independently controlled, when one driving wheel is braked and its rotation speed is decreased, the other driving wheel slips due to the operation of a differential gear and is braked in turn. To prevent reputation of this undesirable operation, the KB is set as above described.

The slip amount DVFR of the right driving wheel WFR obtained by the adder 59 is sent to a differential section 63. The slip amount DVFL of the left driving wheel WFL obtained by the adder 62 is sent to a differential section 64. The differential sections 63 and 64 each differentiates the slip amounts DVFR and DVFL of the driving wheels, respectively, to determine their changing values as functions of time, i.e., slip accelerations GFR and GFL. The slip acceleration FGR of the right driving wheel WFR is supplied to a braking hydraulic pressure variation ($\Delta P$) calculating section 65, and the slip acceleration GFL of the left driving wheel WFL is supplied to a braking hydraulic pressure variation ($\Delta P$) calculating section 66. The braking hydraulic pressure variation ($\Delta P$) calculation sections 65 and 66 determine braking hydraulic pressure variations $\Delta P$ for controlling the slip accelerations GFR and FGL for the respective driving wheels WFR and WFL referring to a GFR (GFL)−$\Delta P$ conversion map shown in FIG. 14. The braking hydraulic pressure variations $\Delta P$ for the respective left and right driving wheels WFR and WFL are supplied to $\Delta P - T$ converting sections 67 and 68, respectively. The $\Delta P - T$ converting sections 67 and 68 convert the brake hydraulic pressure variations $\Delta P$ each corresponding to the respective right and left driving wheels into open times T of inlet valves 17i, 18i and outlet valves 17o, 18o shown in FIG. 1(A). When a value of the $\Delta P$ is positive, the inlet valve 17i for the right driving wheel WFR is controlled to be opened according to an open time T obtained by the $\Delta P - T$ converting section 67 and the inlet valve 18i for the left driving wheel WFL is controlled to be opened according to an open time T obtained by the $\Delta P - T$ converting section 68. When a value of the $\Delta P$ is negative, the outlet valve 17o for the right driving wheel WFR is controlled to be opened according to open time T obtained by the $\Delta P - T$ converting section 67 and the outlet valve 18o for the left driving wheel WFL is controlled to be opened according to an open time T obtained by the $\Delta P - T$ converting section 68.

Figure 14:
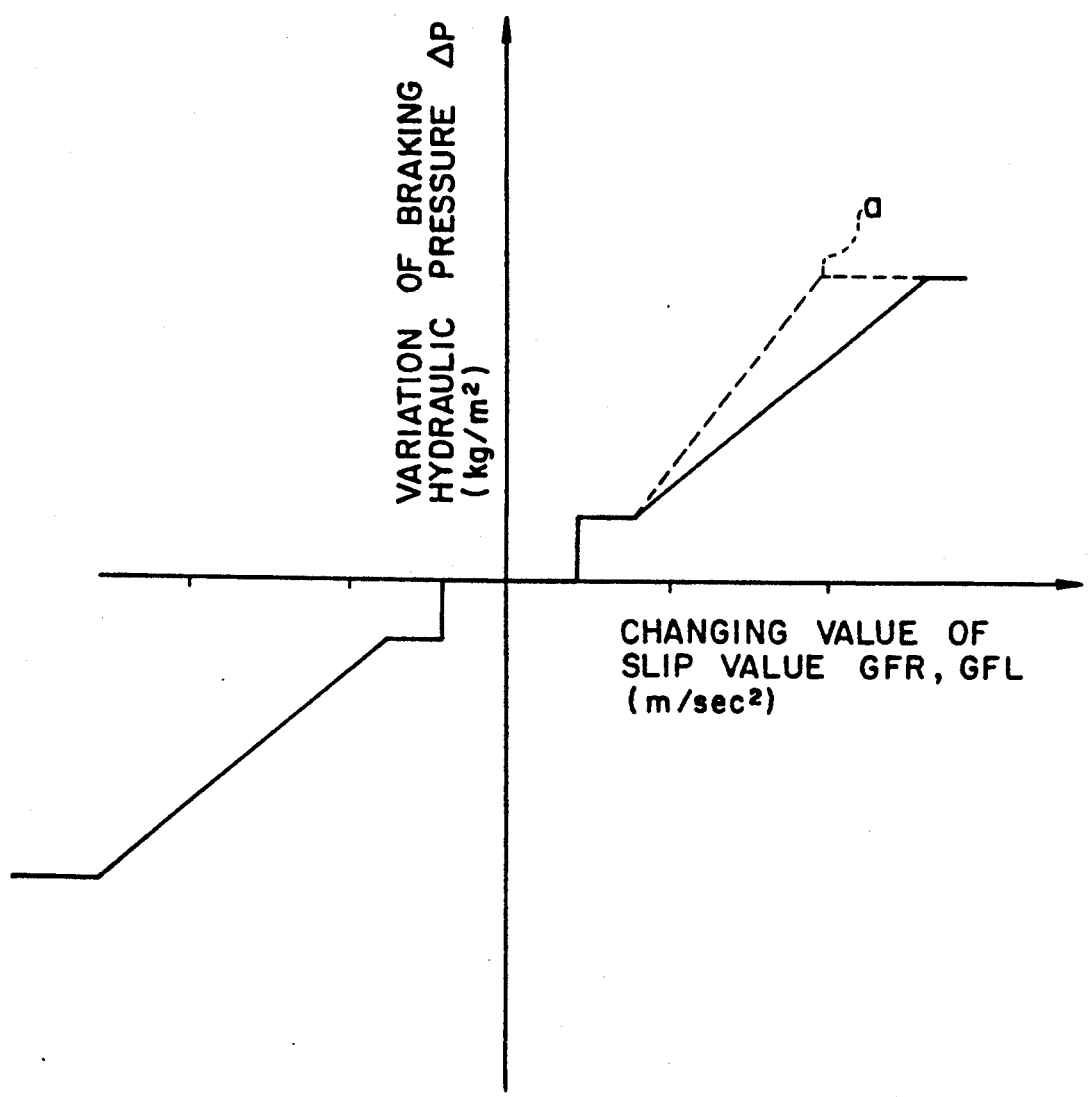
FIG. 14 is a graph showing the relationship between a changing value GFR (GFL) of the slip value and a variation ΔP of a braking hydraulic pressure.

On the GFR (GFL)−$\Delta P$ converting map shown in FIG. 14, changing values as indicated by a broken line a is to strengthen braking of the inner driving wheel during turning.

A switch S1 is interposed between the subtractor 49 for calculating the target torque T$\phi$ and the engine torque calculating section 50. A switch S2a is interposed between the braking hydraulic pressure variation ($\Delta P$) calculating section 65 and the $\Delta P - T$ conversion 67, a switch S2b between the braking hydraulic pressure variation ($\Delta P$) calculating section 66 and the $\Delta P - t$ conversion 68. The switches S1, S2a and S2b each is controlled to be opened or closed when a condition for opening/closing operation of slip control is satisfied, as described hereinafter. The switches S1, S2a and S2b are controlled to be opened/closed respectively by a control start/finish judging section 69. The control start/finish judging section 69 is supplied a slip judging signal from a slip judging section 70. The slip judging section 70 judges whether the whether the slip amount $DV_i$ obtained through the substractor 41 and the adder 42 on the basis of the driving wheel velocity VF and the driven wheel velocity VR exceeds a slip judging value $\alpha$ stored beforehand in a slip judging value ($\alpha$) storing section 71. The slip judging signal is supplied to the control start/finish judging section 69.

The control start/finish judging section 69 outputs a control starting signal to close the switches S1, S2a and S2b when receiving a slip judging signal ($DV_i > \alpha$) from the slip judging section 70. The control start/finish judging section 69 outputs a control finishing signal to open the switches S1, S2a, and S2b when receiving a non-slip judging signal ($DV_i \leq \alpha$) from the slip judging section 70.

The operation of the acceleration slip preventing apparatus for a vehicle will described below.

In FIGS. 1(A) to 2, the wheel velocities of driven wheels (rear wheels) output from the wheel velocity sensors 13 and 14 are input to the higher-velocty selector 36, the lower-velocity selector 37, and the centripetal acceleration calculating section 53. A smaller wheel velocity is selected between the two velocities of the right and left driven wheels by the lower-velocity selector 36 and a larger one is selected between the two velocities of the driven wheels by the higher-velocity selector 37. During normal straight traveling, when the wheel velocities of the right and left driven wheels are equal to each other, the same wheel velocity is selected by the lower-velocity selector 36 and the higher-velocity selector 37. The centripetal acceleration calculating section 53 receives the wheel velocities of the right and left driven wheels, and calculates a degree of turning when the vehicle makes a turn on the basis of those wheel velocities of the right and left driven wheels, i.e., a degree of abrupt turning.

How to calculate the centripetal acceleration in the centripetal acceleration calculating section 53 will be described below. In a front-drive vehicle, since the rear wheels are driven wheels, a vehicle velocity at that position can be detected by the wheel velocity sensors regardless of a slip caused by the driving force. Therefore, an Ackerman geometry can be utilized. More specifically, during steady turning, the centripetal acceleration GY' is given by:

$$GY' = v^2/r \quad (5)$$

(v = vehicle velocity, r = radius of turning)

Figures 19, 20:
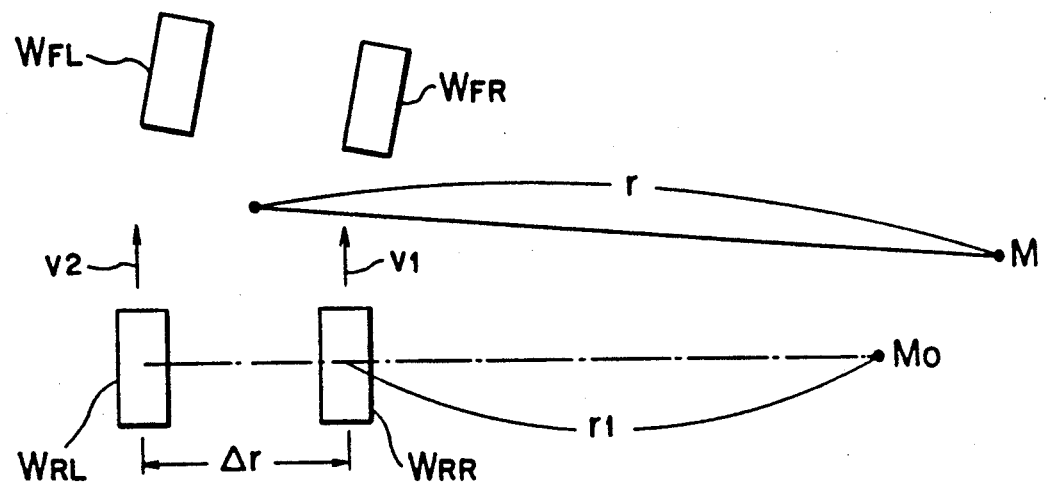
FIG. 19 is a view showing a vehicle turning state.
FIG. 20 shows a target engine torque-engine speed map used for determining a target air amount.

For example, as shown in FIG. 19, when the vehicle makes a right turn, if the center of turning is represented by $M_o$, $M_o$ of turning to an inner wheel side (WRR) is represented by rl, a tread is represented by $\Delta r$, a wheel velocity of the inner wheel side (WRR) is represented by $v_2$, the following equation is established:

$$v_2/v_1 = (\Delta r + rl)/rl \quad (6)$$

When equation (6) is modified, $$1/rl = (v_2 - v_1)/\Delta r \cdot vl \quad (7)$$

The centripetal acceleration GY' with reference to the inner wheel side is given by:

$$\begin{aligned} GY' &= vl^2/rl \\ &= vl^2 \cdot (v_2 - v_1)/\Delta r \cdot vl \\ &= vl \cdot (v_2 - v_1)/\Delta r \end{aligned} \quad (8)$$

More specifically, the centripetal acceleration GY' is calculated by equation (8). During turning, since the wheel velocity vl of the inner wheel side is smaller than the wheel velocity $v_2$ of the outer wheel side and the centripetal acceleration GY' is calculated to be smaller than actual one. Therefore, the coefficient KG of the weighting section 33 is estimates to be smaller since the centripetal acceleration GY' is estimated to be smaller. Therefore, since the driving wheel velocity VF is estimated to be smaller, the slip value $DV_i'$ ($= VF - V\phi$) is also estimated to be smaller. Thus, since the target torque $T\phi$ is estimated to be larger, so that a sufficient driving force can be given during turning.

Figure 8:
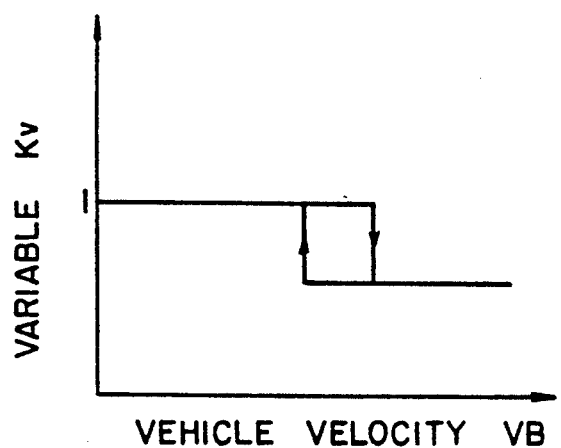
Figure 9:
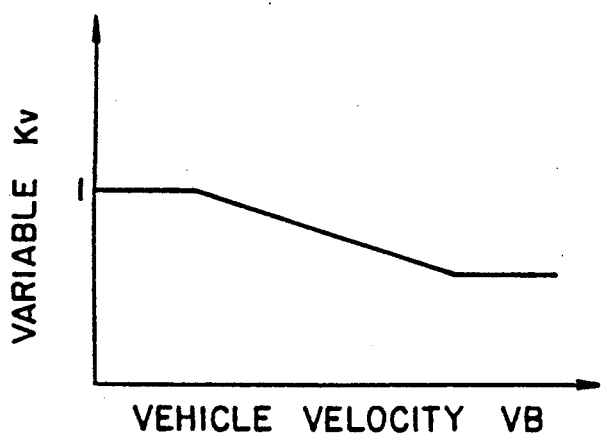

As shown in FIG. 19, although the distance from the inner wheel side to the center $M_o$ of turning is rl at an extremely low speed, the center of turning is shifted to M in a vehicle which tends to understeer as a speed is increased, and the distance becomes r (r > rl). In this manner, when the speed is increased, since the radius of turning is calculated as rl, the centripetal acceleration GY' is calculated based on equation (8) to be larger than the actual one. For this reason, the centripetal acceleration GY' calculated by the centripetal acceleration calculating section 53 is sent to the centripetal acceleration correction section 54, and is multiplied by the coefficient $K_v$ shown in FIG. 7 to decrease the centripetal acceleration GY at a high speed. The variable $K_v$ is set to be decreased in accordance with the vehicle velocity, but may be set, as shown in FIG. 8 or 9. In this manner, the corrected centripetal acceleration GY is output from the centripetal acceleration correction section 54.

Figure 10:
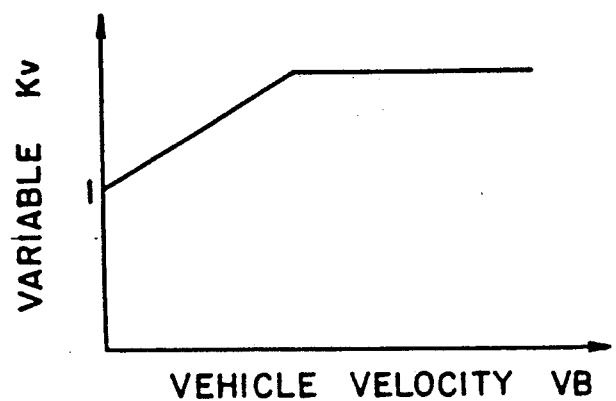
Figure 11:
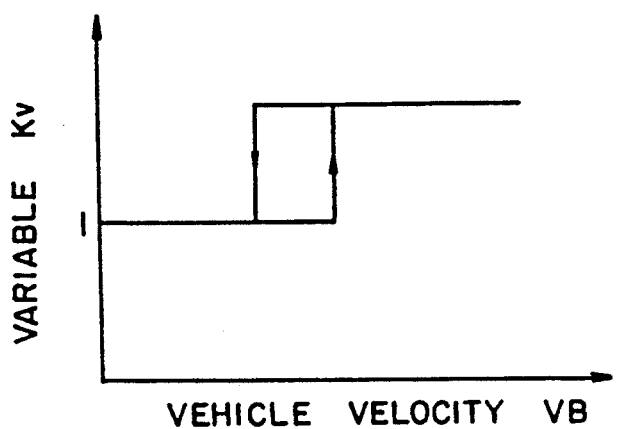
Figure 12:
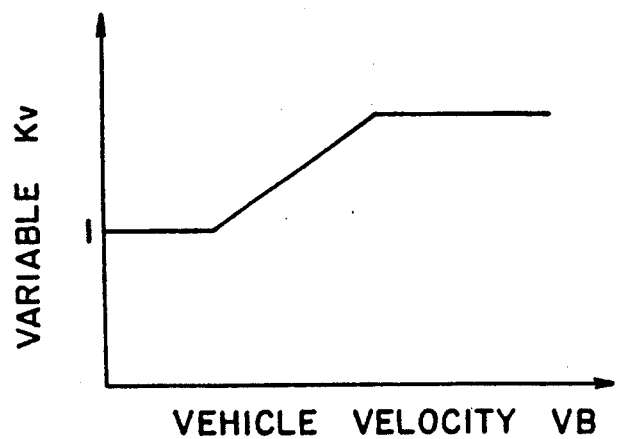

On the other hand, in a vehicle which tends to oversteer as a speed is increased (r < rl), correction quite opposite to the vehicle which tends to understeer is performed by the centripetal acceleration correction section 54. More specifically, one of variables $K_v$ shown in FIGS. 10 to 12 is used, and the centripetal acceleration GY' calculated by the centripetal acceleration calculating section 53 is corrected to be increased as the vehicle velocity is increased.

The lower wheel velocity selected by the lower-velocity selector 36 is multiplied by the variable $K_r$ by the weighting section 38, as shown in FIG. 4, and the higher wheel velocity selected by the higher-velocity selector 37 is multiplied by the variable ($1 - K_r$) by the weighting section 39. The variable $K_r$ is set to be "1" when the centripetal acceleration GY exceeds, e.g., 0.9 g during turning, and is set to be "0" when the centripetal acceleration is decreased to be smaller than 0.4 g.

Therefore, for turning during which the centripetal acceleration GY exceeds 0.9 g, the lower wheel velocity, i.e., inner wheel velocity upon turning is selected from the driven wheel velocities output from the lower-velocity selector 36. The wheel velocities output from the weighting sections 38 and 39 are added each other by the adder 40 to obtain the driven wheel velocity VR. The driven wheel velocity VR is multiplied by ($1 + \alpha$) by the multiplier 40', thereby calculating the target driving wheel velocity $V\phi$.

Figure 18:
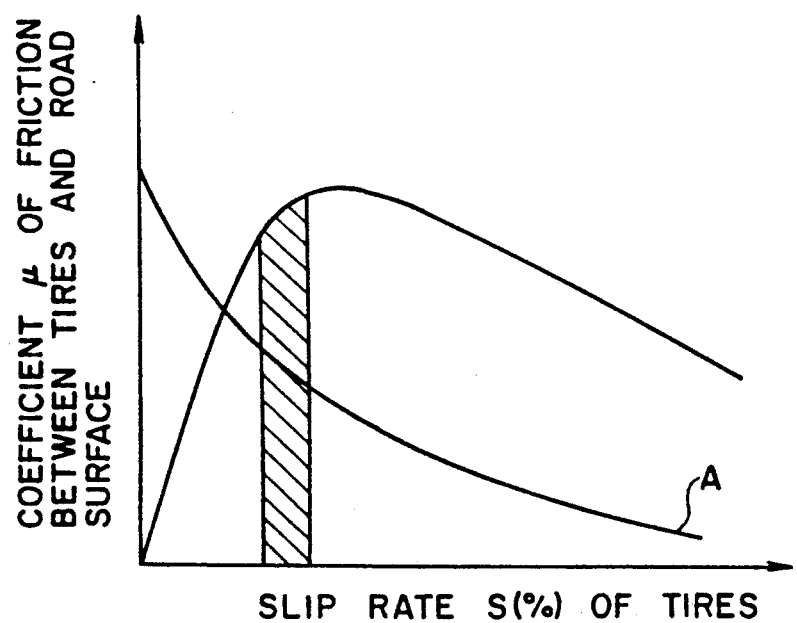

After the higher wheel velocity of the driving wheel velocities is selected by the higher-velocity selecting section 31, the selected velocity is multiplied by the variable KG by the weighting section 33, as shown in FIG. 3. An average wheel velocity (VFR + VFL)/2 of the driving wheels calculated by the averaging section 32 is multiplied by ($1 - KG$) by the weighting section 34. The outputs from the weighting sections 33 and 34 are added to each other by the adder 35 to obtain the driving wheel velocity VF. Therefore, when the centripetal acceleration GY exceeds 0.1 g, since KG = 1, the higher driving wheel velocity of the two driving wheel velocities which is output from the higher-velocity selector 31 is output. More specifically, when a degree of turning of the vehicle is increased and the centripetal acceleration GY exceeds 0.9 g, since "KG = $K_r$ = 1", the outer wheel side wheel velocity as a higher wheel velocity is selected as the driving wheel velocity VF for the driving wheel side, and the inner wheel side wheel velocity as a lower wheel velocity is selected as the driven wheel velocity VR for the driven wheel side. For this reason, the slip value $DV_i'$ ($=VF-V\phi$) calculated by the subtractor 41 is estimated to be larger than that in a straight travel state. Therefore, since the target torque $T\phi$ is estimated to be smaller than that in the straight travel state, the engine output is decreased to be smaller than in the straight travel state to decrease the slip rate S, thereby increasing a lateral force A, as shown in FIG. 18. As a result, a gripping force of the wheels during turning can be increased, thus assuring safe turning.

Figure 5:
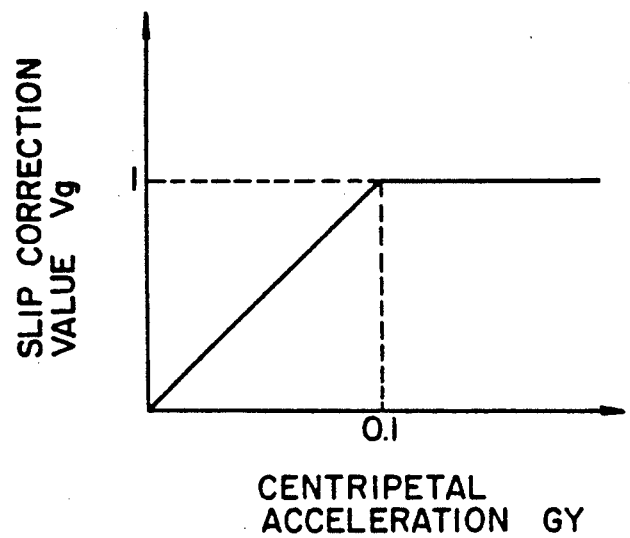
FIG. 5 is a graph showing the relationship between the centripetal acceleration GY and a slip correction value Vg.
Figure 6:
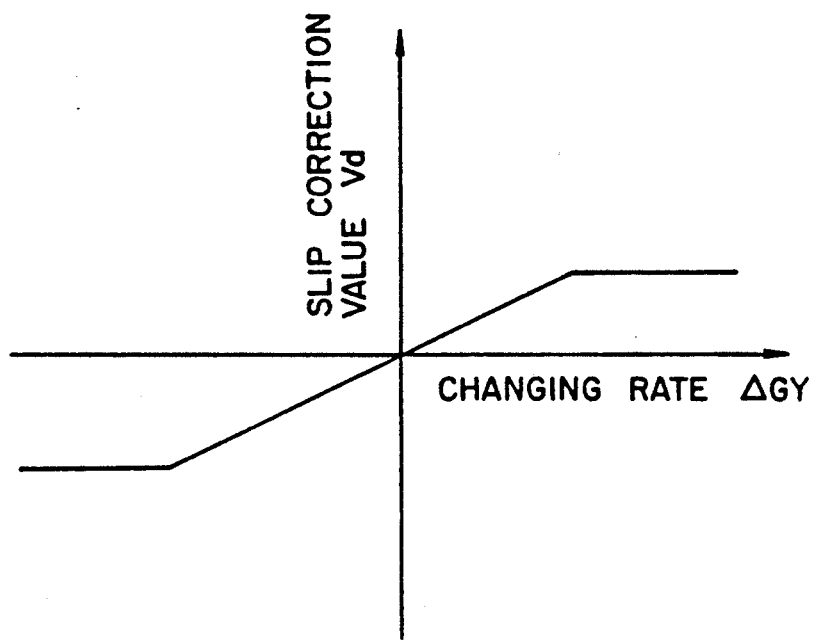
FIG. 6 is a graph showing the relationship between the changing rate ΔGY as a function of time of the centripetal acceleration GY and the slip correction value Vd.
Figure 7:
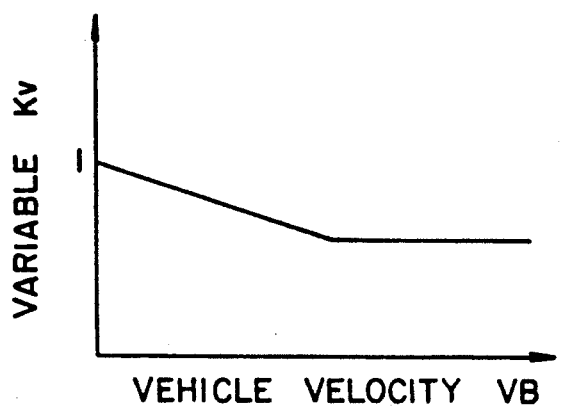
FIGS. 7 to 12 are graphs respectively showing the relationship between a vehicle velocity VB and a variable Kv.

The slip correction value $v_g$ shown in FIG. 5 is added to the slip value $DV_i'$ by the slip value correction section 43 only during turning, i.e., only when centripetal acceleration GY is generated, and the slip value $V_d$ shown in FIG. 6 is added to the sum by the slip value correction section 44. For example, when a vehicle is assumed to make a turn at a right-angle corner, the centripetal acceleration GY and its changing rate ΔGY as a function of time become positive value in the first half of the turn. However, the changing rate ΔGY as a function of time of the centripetal acceleration GY becomes a negative value in the second half of turn. Therefore, in the first half of the turn, the slip correction value $v_g$ (>0) shown in FIG. 5 and the slip correction value $V_d$ (>0) shown in FIG. 6 are added to the slip value $DV_i'$ by the adder 42 to yield the slip value $DV_i$. In the second half of the turn, the slip correction value $V_g$ (>0) and the slip correction value $V_d$ (<0) are added to the slip value $DV_i'$ to obtain the slip value $DV_i$. Therefore, when the slip value $DV_i$ in the second half of the turn is estimated to be smaller than that in the first half to the turn, the engine output is decreased to increase the lateral force in the first half of the turn, and the engine output is recovered to be larger than that in the first half to improve acceleration characteristics of the vehicle in the second half of the turn.

In this manner, the corrected slip value $DV_i$ is sent to the $TS_n$ calculating section 45, for example, at a 15-ms sampling time T. The slip values $DV_i$ are integrated while being multiplied by the coefficient KI by the $TS_n$ calculating section 45, thereby obtaining the correction torque $TS_n$ given by:

$$TS_n = GK_i \cdot \Sigma(KI \cdot DV_i)$$

(where KI is the coefficient which changes according to the slip value $DV_i$).

That is, the correction torque obtained by integrating the slip values $DV_i$, i.e., the integral correction torque $TS_n$ is calculated.

The slip value $DV_i$ is sent to the $TP_n$ calculating section 46 every sampling time T, thereby calculating the correction torque $TP_n$ given by:

$$TP_n = GK_p \cdot DV_i \cdot K_p$$

(where $K_p$ is the coefficient).

That is the correction torque proportional to the slip value $DV_i$, i.e., the proportional correction torque $TP_n$ is calculated.

The values of the coefficients $GK_i$ and $GK_p$ used in calculation of the coefficient multipliers 45b and 46b are switched to values according to the transmitted transmission range after the elapsed of a predetermined period of time from the beginning of transmission in a shift-up operation for the following reason. It takes much time from the beginning of transmission until the transmission range is actually switched to complete the transmission operation. If the coefficients $GK_i$ and $GK_p$ corresponding to a transmitted higher-speed range are used from the beginning of transmission in the shift-up operation, the values of the correction torques $TS_n$ and $TP_n$ become values corresponding to the higher-speed range i.e., become smaller than those before the beginning of transmission although the actual transmission operation is not yet completed. For this reason, the target torque $T\phi$ is undesirably increased, and a slip is induced, resulting in unstable control.

The driving wheel velocity VR output from the adder 40 is input to the reference torque calculating section 47 as the vehicle velocity VB. The vehicle acceleration calculating section 47a calculates an acceleration GB of the vehicle velocity VB. The acceleration GB of the vehicle velocity calculated by the vehicle acceleration calculating section 47a is filtered through one of the filters represented by equations (1) to (3) by the filter 47b, as has been described in the description of the arrangement, so that GBF is controlled to an optimal position in accordance with the state of the acceleration GB. The reference torque calculating section 47c calculates a reference torque TG ($=GBF \times W \times R_e$).

The integral correction torque $TS_n$ is subtracted from the reference torque TG by the subtractor 48, and the proportional correction torque $TP_n$ is subtracted from the difference by the subtractor 49. In this manner, the target torque $T\phi$ is calculated as:

$$T\phi = TG - TS_n - TP_n$$

The target torque $T\phi$, i.e., the axle torque $T\phi$, is input to the engine torque calculating section 50 through the switch S1, and is converted into a target engine torque $T_e$. The lower limit of the target engine torque $T_e$ is limited by the lower limit setting section 501 which sets the lower limit $T_{lim}$ of the engine torque. The target torque $T_{el}$ whose lower value is limited is sent to the target air mount calculating section 502, thereby calculating the target air amount $A/N_o$ for outputting the target engine torque $T_{el}$. The target air amount $A/N_o$ output from the target air amount calculating section 502 is sent to the target throttle opening calculating section 503, thereby obtaining the target throttle opening $\theta_{mo}'$ for the engine speed N and the target air amount $A/N_o$, referring to the map shown in FIG. 21.

The target air amount calculating section 502 selects a larger target air amount $A/N_o$ during the operation of non-slip control. More specifically, during the switch S1 is opened, no slip control start signal is output from the control start/finish judging section 69. Thus, the target air amount $A/N_o$ according to the target engine torque $T_{el}$ is substantially "0" so that the target air amount $A/N_o$ corresponding to the acceleration operation amount $\theta AC$ is selected to be supplied to the target throttle opening calculating section 503.

During operation of slip control, a smaller target air amount $A/N_o$ is selected to be output. More specifically, in condition where the switch S1 is controlled to be opened by a slip control start signal output from the control start/finish judging section 69, a target air amount $A/N_o$ according to the acceleration operation amount $\theta AC$ is obtained in order to control the slip of the driving wheels. If the target air amount $A/N_o$ according to the acceleration operation amount $\theta AC$ is larger than that according to the target engine torque $T_{el}$, the target air amount $A/N_o$ according to the target engine torque $T_{el}$ is selected in order to control the slip of the driving wheels. If the acceleration operation amount $\theta AC$ is decreased to control the slip by the driver's operation, the target air amount $A/N_o$ according to the acceleration operation amount $\theta AC$ is selected to be supplied to the target throttle opening calculating section 503.

The target air amount $A/N_o$ selected by and output from the target air amount calculating section 502 is supplied to the subtractor 504, thereby calculating a difference $\Delta A/N$ between the target air amount $A/N_o$ and the actual air amount $A/N$ detected every predetermined sampling time by the air flow sensor 28. The difference $\Delta A/N$ is supplied to the PID controller 505 to be subjected to PID control, thus calculating a opening correction value $\Delta \theta$ corresponding to the difference $\Delta A/N$. The opening correction value $\Delta \theta$ is sent through the switch A3 to the adder 506 to be added to the target throttle opening value $\theta_{mo}'$, thereby calculating a feedback-corrected target throttle opening $\theta_{mo}$. The feedback-corrected target throttle opening $\theta_{mo}$ is further sent to the subtractor 507. The subtractor 507 calculates a deviation $\Delta \theta_m$ $(=\theta_{mo}-\theta_m)$ between the target throttle opening $\theta_{mo}$ and an actual throttle opening $\theta_m$ detected by the throttle position sensor 26. A motor driving signal $D_M$ is output through the switch A1 to the motor driving circuit 25 in order to make the deviation $\Delta \theta_m$ between the target throttle opening $\Delta \theta_m$ and the actual throttle opening $\theta_m$ "0". Accordingly, the throttle opening $\theta_m$ is adjusted to the target engine torque $T_{el}$ or the target throttle opening $\theta_{mo}$ according to the acceleration operation amount $\theta AC$.

That is, in the case that the switches A1 and A3 is controlled to be closed and the switch A2 is controlled to be opened by the failure judging section 15a besides a value of the throttle opening deviation $\Delta \theta_m$ obtained in the subtractor 507 is a positive (+) value, a value of the target throttle opening $\theta_{mo}$ is larger than that of the actual throttle opening $\theta_m$. Consequently, a motor driving signal $+D_M$ for driving the throttle valve (TH$_m$) in the opening direction, whereby the throttle valve TH$_m$ is driven in the opening direction until the actual opening $\theta_m$ of the throttle valve (TH$_m$) coincides with the target throttle valve opening $\theta_{mo}$. In this case, the step data stored in the memory 25a of the motor driving circuit 25 is added "+1" every step rotation of the motor 24 in the opening direction. When the throttle opening deviation $\Delta \theta_m$ obtained by the subtractor is a negative (−) value in this case, the value of the target throttle opening $\theta_{mo}$ is smaller than that of the actual throttle opening $\theta_m$. Consequently, a motor driving signal $-D_M$ for driving the throttle valve (TH$_m$) in the closing direction is output, whereby the throttle valve (TH$_m$) is driven in the closing direction until the actual opening $\theta_m$ of the throttle valve (TH$_m$) coincides with the target throttle valve opening $\theta_{mo}$. In this case, the step data stored in the memory 25a of the motor driving circuit 25 is added "−1" every step rotation of the motor 24 in the closing direction.

In this manner, the feedback control for the throttle opening position on the basis of the target throttle opening $\theta_{mo}$ and the actual throttle opening $\theta_m$ is repeated, thus adjusting the opening $\theta_m$ of the throttle valve (TH$_m$) 23 to the target throttle opening $\theta_{mo}$.

On the other hand, in the case that the switch A2 is controlled to be closed and the switch A1 is controlled to be opened by the failure judging section 15a besides the intake air amount deviation $\Delta A/N$ obtained by the subtractor 504 is a positive (+) value, the value of the target air mount $A/N_o$ is larger than that of the actual air amount $A/N$. Thus, a motor driving signal $+D_M$ for driving the throttle valve (TH$_m$) 23 in the opening direction is output, whereby the throttle valve (TH$_m$) 23 is driven in the opening direction until the actual air amount $A/N$ coincides with the target air amount $A/N_o$. In this case, the step data stored in the memory 25a of the motor driving circuit 25 is added "+1" every step rotation of the motor 24 in the opening direction. When the air amount deviation $A/N$ obtained in the subtractor 504 is a negative (−) value in this case, the value of the target air amount $A/N_o$ becomes smaller than that of the actual air amount $A/N$. Thus, a motor driving signal $-DM_M$ for driving the throttle valve (TH$_m$) 23 in the closing direction is output, whereby the throttle valve (TH$_m$) 23 is driven in the closing direction until the actual air amount $A/N$ coincides with the target air amount $A/N_o$. In this case, the step data stored in the memory 25a of the motor driving circuit 25 is added "−1" every step rotation of the motor 24 in the closing direction.

Thereafter, the feedback control for the throttle opening $\theta_m$ determined on the basis of the target air amount $A/N_o$ and the actual air amount $A/N$ is repeated, thus adjusting the opening $\theta_m$ of the throttle valve (TH$_m$) 23 to the target throttle opening $\theta_{mo}$ in order to obtain the target air amount $A/N_o$.

Furthermore, when the switch A1 in controlled to be closed, and the switches A2 and A3 are controlled to be opened by the failure judging section 15a, a basic target throttle opening $\theta_{mo}'$ obtained by the target throttle opening calculating section 503 is not subjected to the feedback correction on the basis of the air amount deviation $\Delta A/N$. The basis target throttle opening $\theta_{mo}'$ becomes a target throttle opening $\theta_{mo}$ itself, whereby a motor driving signal $D_M$ is output through the switch A1 to the motor driving circuit 25 in order to make the deviation $\Delta \theta_m$ between the target throttle opening $\theta_{mo}$ and the actual throttle opening $\theta_m$ "0". As a result, the throttle opening $\theta_m$ is adjusted to the target throttle opening $\theta_m$.

Switching and controlling operation of the switches A1 to A3 performed by the failure judging section 15a on the basis of the failure judging process of the air flow sensor 28, the throttle position sensor 26 and the engine torque sensor 84 will be hereinafter described.

Figure 28:
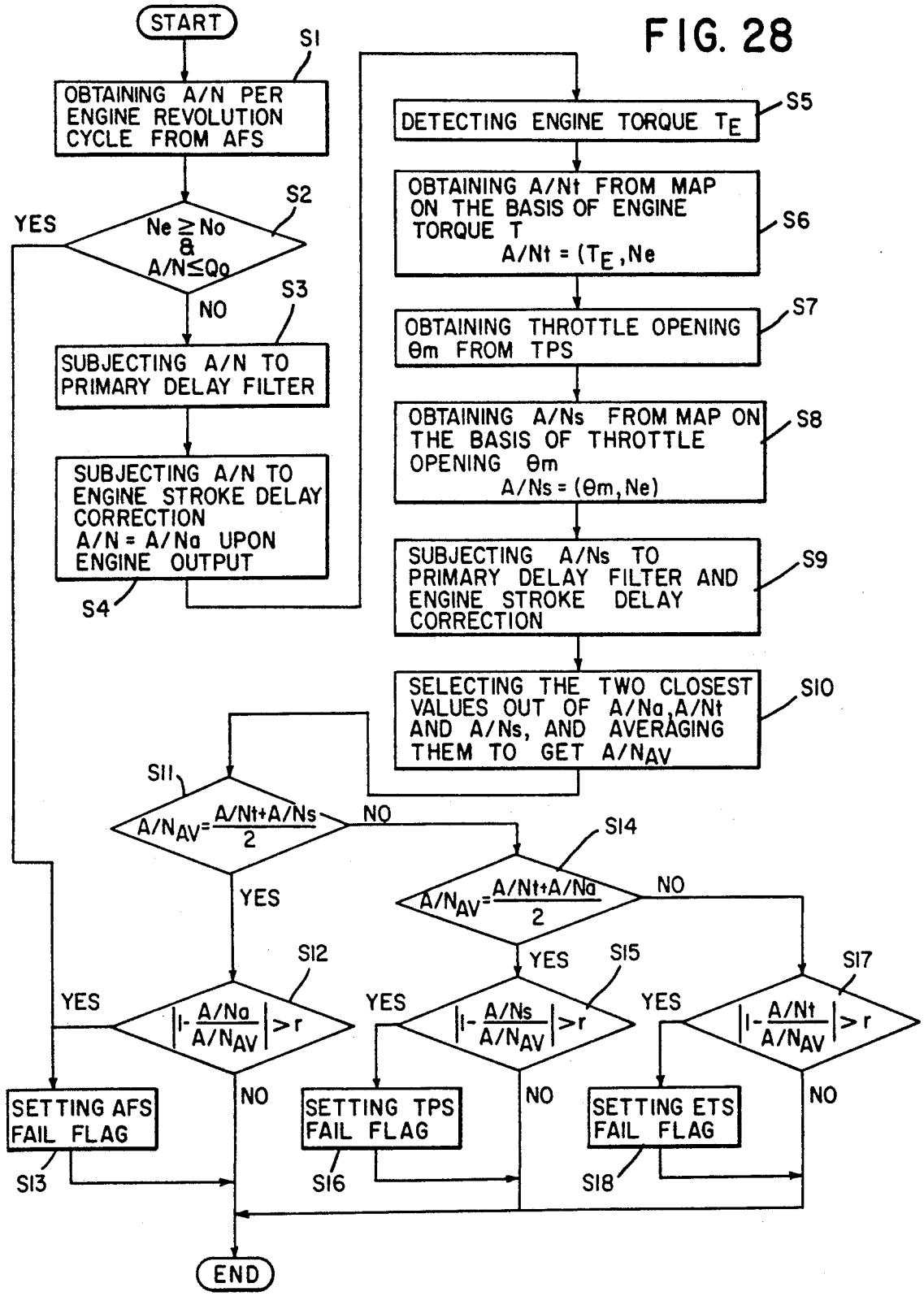
FIG. 28 is a flow chart showing a failure judging process in the failure judging section of the traction controller.

FIG. 28 is a flow chart showing the failure judging process of the sensors. In step S1, the failure judging section 15a receives an intake air amount $A/N$ per engine revolution cycle obtained by the air flow sensor 28. In step S2, the failure judging section 15a judges whether an engine speed $N_e$ obtained by the engine speed sensor 83 is larger than a predetermined engine speed $N_o$ ($N_e \geq N_o$) and an intake air amount $A/N$ per engine revolution cycle is smaller than a predetermined air amount $Q_o$ ($A/N \leq Q_o$). If the obtained answer is "YES", that is, if the intake air amount $A/N$ obtained by the air flow sensor 28 is smaller than the predetermined amount $Q_o$, although the engine speed $N_e$ is larger than the predetermined speed $N_o$, the failure judging section 15a judges that a trouble occurs in the air flow sensor 28. Accordingly, advancing to step S13, a failure judging flag of the air flow sensor (AFS) 28 is set.

On the contrary, if the judgement is "NO" in step S2, that is, if the engine speed $N_e$ is larger than the predetermined speed $N_o$ and the intake air amount A/N detected by the air flow sensor 28 is larger than the predetermined amount $Q_o$, it is judged that no simple trouble such as disconnection occurs in the air flow sensor 28, thus advancing to step S3.

In step S3, the intake air amount A/N per engine revolution cycle obtained by the air flow sensor 28 in step S1 is filtered by the filter to be subjected to the primary time-delay correction.

More specifically, a primary-delay corrected intake air amount $A/N_{IN}$ is given by the following equation:

$$A/N_{IN} = (1-a)A/N_{IN-1} + aA/N$$

where $a$ is a coefficient determined according to a volume of the intake pipe and a volume of the cylinder.

In step S4, the primary-delay corrected intake air amount $A/N_{IN}$ is subjected to the engine-stroke-delay correction.

More specifically, upon calculating the cycle synchronization, $A/N_{IN-1}$ based on A/N which is detected two storkes, i.e., "intake" and "expansion" strokes, before is used as the intake air amount $A/N_a$ which is detected by the air flow sensor 28 and subjected to the primary-delay correction for the engine torque $T_E$.

In step S5, the failure judging section 15a receives an output torque $T_E$ of the engine 16 detected by the engine torque sensor 84. In step S6, an intake air amount $A/N_t$ according to the engine torque $T_E$ is determined, referring to the $T_E-A/N_t$ map shown in FIG. 26, in the failure judging section 15a.

In step S7, the failure judging section 15a is input a throttle opening $\theta_m$ of the throttle valve ($TH_m$) 23 detected by the throttle position sensor 26. In step S8, an intake air amount $A/N_S$ according to the throttle opening $\theta_m$ is obtained, referring to the $\theta_m - A/N_S$ shown in FIG. 27, in the failure judging section 15a.

In step S9, the primary-delay and engine-stroke-delay corrections are made to the intake air amount $A/N_S$ obtained on the basis of the throttle opening $\theta_m$ in step S8 in the same manner, as done in steps S3 and S4.

In steps S1 to S9, there are obtained three different intake air amounts obtained by the three different air amount judging means, i.e., an intake air amount $A/N_a$ detected by the air flow sensor 28, an intake air amount $A/N_S$ based on the throttle opening $\theta_m$ and an intake air amount based on the engine torque $T_E$, each being subjected to the time-delay corrections. In step S10, two intake air amounts having the closest values to each other among the three intake air amounts, i.e., $A/N_a$, $A/N_s$ and $A/N_t$, are selected to be added each other. The sum is averaged to yield $A/N_{AV}$.

In step S11, if the two closest intake air amounts are $A/N_t$ and $A/N_S$, their average is calculated to be $A/N_{AV}[=(A/N_t+A/N_S)/2]$. In step S12, the remaining intake air amount $A/N_a$ is divided by the averaged intake air amount $A/N_{AV}$ and further substracted from "1". Thus-obtained value $[|1-\{(A/N_a)/(A/N_{AV})\}|]$ is judged whether it exceeds a predetermined allowed value r (30%, for example) ($>r$) or not ($\leq r$), in step S12. That is, in step S12, a judgement is made on whether the intake air amount $A/N_a$ has a value removed from the other two amounts $A/N_s$ and $A/N_t$, and exceeding the predetermined value r, i.e., a value being abnormal. If the obtained answer is "YES", i.e., $[|1-\{(A/N_a)/(A/N_{AV})\}|>r]$, the actual intake air amount detected by the air flow sensor 28 is abnormal, thus setting an air flow sensor (AFS) fail flag showing a trouble in the air flow sensor 28, in step S13.

In this case, if a trouble occurs in the air flow sensor 28, the throttle control added to air amount feedback for obtaining a throttle opening correction value $\Delta\theta$ for the target throttle opening $\theta_m{}_o'$ obtained through the subtractor 504 and the PID controller 505 becomes unavailable. When the AFS fail flag for the air flow sensor 28 is set in the failure judging section 15a, the switch A1 is controlled to be closed, and the switches A2 and A3 are switched over to the opening positions and held therein. Accordingly, the throttle control is changed to be performed by only feedback of the actual throttle opening $\theta_m$.

If the two closest values of the intake air amounts to be averaged are decided to be $A/N_t$ and $A/N_a$ in step S10 and their average is calculated to be $A/N_{AV}[=(A/N_t+A/N_a)/2]$, the remaining intake air amount $A/N_S$ is divided by the averaged intake air amount $A/N_{AV}$ and then subtracted from "1" $[|1-\{(A/N_s)/(A/N_{AV})\}|]$, in step S15. The obtained value is then judged whether it exceeds a predetermined allowed value r (30%, for example) ($>r$) or not ($\leq r$). That is, it is judged, in step S15, whether the intake air amount $A/N_s$ has a value removed from the other two intake air amounts $A/N_a$ and $A/N_t$, and exceeding a predetermined allowed value r, i.e., a value being abnormal. If the obtained answer is "YES", i.e., $[|1-\{(A/N_s)/(A/N_{AV})\}|>r]$, the intake air amount $A/N_s$ based on the throttle opening $\theta_m$ obtained by the throttle position sensor 26 is decided to be abnormal, thus setting a throttle position sensor (TPS) fail flag showing a trouble in the throttle position sensor 26, in step S16.

In this case, if a trouble occurs in the throttle valve sensor 26, the feedback control on the bases of the actual throttle opening $\theta_m$ for obtaining a motor driving signal $D_M$ through the subtractor 507 becomes unavailable. When the TPS fail flag for the throttle position sensor 26 is set in the failure judging section 15a, the switch A1 is controlled to be opened and the switch A2 is switched over to the closing position and held therein, thereby changing to the feedback control performed on the basis of the actual intake air amount A/N.

Furthermore, if the closest values of the intake air amounts to be averaged are decided to be $A/N_a$ and $A/N_s$ in step S10 and their average is calculated to be $A/N_{AV}[=(A/N_a+A/N_s)/2]$, the remaining intake air amount $A/N_t$ is divided by the averaged intake air amount $A/N_{AV}$ and then subtracted from "1" $[|1-\{(A/N_t)/(A/N_{AV})\}|]$, in step S17. The obtained value is then judged whether it exceeds a predetermined allowed value r (30%, for example) ($>r$) or not ($\leq r$). That is, it is judged, in step S17, whether the intake air amount $A/N_t$ has a value removed from the other two intake air amounts $A/N_a$ and $A/N_s$, and exceeding a predetermined allowed value r, i.e., a value being abnormal. If the obtained answer is "YES", i.e., $[|1-\{(A/N_t)/(A/N_{AV})\}|>r]$, the intake air amount $A/N_t$ obtained on the basis of the engine torque $T_E$ detected by the engine torque sensor 84 is decided to be abnormal, thus setting an engine torque sensor (ETS) fail flag showing a trouble in the engine torque sensor 84, in step S18.

In this case, the control operation in accordance with the engine torque $T_E$ detected by the engine torque sensor 84 is suspended.

That is, comparing the three intake air amounts $A/N_a$, $A/N_s$ and $A/N_t$ obtained by the three intake air amount judging means, respectively, if any one of these amounts is decided to be removed from the other two, the one of the intake air amount judging means i.e., the throttle position sensor 26, the air flow sensor 28 and the engine torque sensor 84, from which the abnormal value is obtained is decided to be in trouble, thus being available a reliable judgement for a failure of the sensors.

Since the intake air amounts $A/N_a$, $A/N_s$ and $A/N_t$ are obtained by air flow sensor 28, on the basis of a throttle opening $\theta_m$ detected by a throttle position sensor 26 and an engine output torque $T_E$ detected by the engine torque sensor 84, respectively, failure judgement on these air amount judging means, i.e., the throttle position sensor 26, the air flow sensor 28 and the engine torque sensor 84, may be performed in any state during engine operation.

Meanwhile, the higher driven wheel velocity output from the higher-velocity selector 37 is subtracted from the wheel velocity VFR of the driving wheel by a subtractor 55. The higher driven wheel velocity output from the higher-velocity selector 37 is subtracted from the wheel velocity VFL of the driving wheel by a subtractor 56. Therefore, the outputs from the subtractors 55 and 56 are estimated to be smaller than a value for controlling the engine torque, so that the number of times of use of brakes during the turning is decreased, thereby eliminating a slip of the driving wheels due to decreasing the engine torque.

The output from the subtractor 55 is multiplied by KB (0<KB<1) by the multiplier 57. The output from the subtractor 56 is multiplied by (1−KB) by the multiplier 58. Thereafter, the outputs from the multipliers 57 and 58 are added to each other by the adder 59 to obtain the slip value DVFR for the right driving wheel. At the same time, the output from the subtractor 56 is multiplied by KB by the multiplier 60, and the output from the subtractor 55 is multiplied by (1−KB) with the multiplier 61. Thereafter, the outputs from the multipliers 60 and 61 are added to each other by the adder 62, thus obtaining the slip value DVFL for the left driving wheel. The variable KB changes in accordance with an elapsed time t from the beginning of traction control, as shown in FIG. 13. The variable KB is set to be "0.5" at the beginning of traction control, and is set to approach "0.8" along with the traction control. When a slip of the driving wheels is eliminated by the brakes, both the wheels are simultaneously braked at the beginning of braking, and an uncomfortable shock at a steering wheel at the beginning of braking on, e.g., a split road can be eliminated. An operation when brake control is continued and KB becomes "0.8" will be described below. In this case, when only one driving wheel slips, it is recognized that the other driving wheel also slips by 20% of one driving wheel, brake control is also performed on the other wheel. If brakes of the left and right driving wheels are independently controlled, when one driving wheel is braked and its rotation speed is decreased, the other driving wheel slips due to the operation of a differential gear and is braked in turn. This operation is undesirably repeated. This slip value DVFR for the right driving wheel is differentiated by the differential section 63, thus calculating its changing value as a function of time, i.e., the slip acceleration GFR. At the same time, the slip value DVFL for the left driving wheel is differentiated by the differential section 64, thus calculating its changing value as a function of time, i.e., the slip acceleration GFL. The slip acceleration GFR is sent to the braking hydraulic pressure changing value ($\Delta P$) calculating section 65, and the GFR(GFL)−$\Delta P$ conversion map shown in FIG. 14 is referred to, thus obtaining the variation $\Delta P$ of the braking hydraulic pressure for suppressing the slip acceleration GFL. In the same manner, the slip acceleration GFL is sent to the braking hydraulic pressure changing value ($\Delta P$) calculating section 66, and the GFR(GFL)−$\Delta P$ conversion map shown in FIG. 14 is referred to, thus obtaining the variation ($\Delta P$) of the braking hydraulic pressure for suppressing the slip acceleration GFL.

The variation $\Delta P$ of the braking hydraulic pressure for suppressing the slip acceleration GFR output from the $\Delta P$ calculating section 65 is supplied to the $\Delta P$ converting section 67 for calculating the opening time T of the inlet valve 17$i$ and the outlet valve 17$o$ when the switch S2$a$ is closed, i.e., when the start/finish judging section 69 judges that the control start condition is established. When the variation $\Delta P$ is a positive value, the opening time T for the inlet valve 17$i$ is calculated and when the variation $\Delta P$ is a negative value, the open time T for the outlet valve 17$o$ is calculated. The valve opening time T calculated by the $\Delta P$−T converting section 67 is set to be a braking operation time FR for the right driving wheel WFR. Similarly, the variation $\Delta P$ of the braking hydraulic pressure for suppressing the slip acceleration GFL output from the $\Delta P$ calculating section is supplied to the $\Delta P$ calculating section 68 for calculating the opening time T of the into valve 18$i$ and the outlet valve 18$o$ when the switch S2$b$ is closed, i.e., when the start/finish judging section 69 judges that the control start condition is established. When the variation $\Delta P$ is a positive value, the opening time T for the inlet valve 18$i$ is calculated and when the variation $\Delta P$ is a negative value, the opening time T for the outlet valve 18$o$ is calculated. The valve opening time T calculated by the $\Delta P$−T converting section 68 is set to be a brake operation time FL for the left driving wheel WFL. Thus further slips of the left and right driving wheels WFR and WFL can be suppressed.

In FIG. 14, when braking is performed during turning, the variation $\Delta P$ changes as indicated by a broken line a to strengthen braking of the inner driving wheel during turning. In this manner, although the inner wheel side tends to slip since the weight is shifted to the outer wheel side during turning, the inner wheel side can be prevented from slipping by setting the variation $\Delta P$ of the braking hydraulic pressure of the inner wheel side to be larger than that of the outer wheel side.

When a vehicle is started and accelerated on a road of which surface has a low $\mu$ value, such as a snowy road of which surface is compressed, an acceleration slip occurs on the driving wheels WFR and WFL due to an increase of the engine output when an accelerator pedal is depressed. When the slip value $DV_i$ produced between the road surface and the driving wheels WFR and WFL exceeds a predetermined slip judging value $\alpha$, which is stored in advance in a slip judging value storing section 71, a slip judging signal ($DV_i > \alpha$) is output from the slip judging section 70 to the control start/finish judging section 69. When the control start/finish judging section, which has received the signal, judges a necessitate of slip control for the driving wheels, the switches S1, S2a and S2b are controlled to be closed, thereby initiating the control of the engine torque according to the slip value DV of the driving wheels WFR and WFL, and the slip control performed by the braking operation.

After start of the slip control, when the engine output is decreased because, for example, the main throttle valve ($TH_m$) 23 is closed according to an operation of the accelerator pedal to be returned to the undepressed position, the factor of the slip of the driving wheels WFR and WFL is eliminated. When the slip of the driving wheels WFR and WFL is suppressed, the slip value $DV_i$ becomes smaller than the slip judging value α, which is stored in advance in the slip judging value storing section 71, thereby outputting a slip judging signal ($DV_i \leq \alpha$) from the slip judging section 70 to the control start/finish judging section 69. The control start/finish judging section 69 judges that the slip control for the driving wheels becomes unnecessary, thus controlling the switches S1, S2a and S2b to be opened. In this manner, the engine torque control corresponding to the slip value DV of the driving wheels WFR and WFL, and the braking control are completed.

According to the acceleration slip preventing apparatus for a vehicle of this embodiment, slip occurring on the driving wheels may be assuredly suppressed by appropriately performing an engine torque control and the braking control during slip controlling, thereby improving the acceleration performance of the vehicle. Besides, a failure judgement for an air flow sensor 28, a throttle position sensor 26 and engine torque sensor 84 in the engine air intake system is made by comparing the three different intake air amounts obtained by the respective three intake air amount judging means, i.e., an intake air amount $A/N_a$ obtained by the air flow sensor 28, an intake air amount $A/N_s$ obtained on the basis of a throttle opening $\theta_m$ detected by the throttle position sensor 26 and an intake air amount $A/N_t$ obtained on the basis of an engine torque $T_E$ detected by the engine torque sensor 84, and by judging that a trouble is occurring in one of the three intake air amount judging means, i.e., the throttle position sensor 26, the air flow sensor 28 and the engine torque sensor 84, which shows an abnormal intake air datum. Therefore, the acceleration slip preventing apparatus according to this embodiment may provide a reliable failure judgement besides enabling a failure judging process at any time during engine operation.

In this embodiment, the engine torque sensor 84 is employed as a means for detecting an output torque $T_E$ of the engine 16. However, for a vehicle being employed an automatic transmission, the engine output torque $T_E$ is not detected directly but may be calculated on the basis of an engine acceleration and an absorption torque of a torque converter, by using the following equation:

$$T_E = Ie\{(2\pi/60)N_e\} + C \cdot Ne^2 + T_L$$

where Ie is a moment of inertia of the engine, C is a volumetric value of a torque converter and $T_L$ is an engine load torque.

In the above embodiment, when any one of the three intake air amounts $A/N_a$, $A/N_s$ and $A/N_t$ obtained by the three air amount judging means exceeds a predetermined allowed value r, a fail flag corresponding to a sensor showing an abnormal value is set, at the instant. However, the fail flag may be set only when the abnormal state where one of the values exceeds the predetermined allowed value r continues for a predetermined period for avoiding an effect of a transition time.

The invention has been described in detail with particular reference to a preferred embodiment thereof, but it will be understood that variation and modification can be effected within the spirit and scope of the invention.

What is claimed is:

1. A failure diagnostic apparatus in an engine intake system, which comprises:
   a throttle valve arranged in an intake path of an intake pipe of an engine for controlling an intake air amount by opening and closing a valve thereof;
   throttle opening detecting means for detecting an opening of the throttle valve;
   intake air amount detecting means for detecting a first intake air amount passing through the intake pipe;
   engine torque detecting means for detecting an output torque of the engine;
   first air amount estimating means for estimating a second intake air amount passing through the intake pipe on the basis of the opening of the throttle valve detected by the throttle opening detecting means;
   second air amount estimating means for estimating a third intake air amount passing through the intake pipe on the basis of the output torque of the engine detected by the engine torque detecting means;
   correction means for adding a correction of time delay occurring upon detection of the output torque of the engine to the first intake air amount detected by the intake air amount detecting means and the second intake air amount estimated by the first air amount estimating means, respectively; and
   failure judging means for comparing the first intake air amount added the correction by the correction means, the second intake air amount added the correction by the correction means, and the third intake air amount estimated by the second amount estimating means, thereby judging a failure in any one of the intake air amount detecting means, the throttle opening detecting means and the engine torque detecting means.

2. A failure diagnostic apparatus according to claim 1 wherein the second intake air amount estimated by the first air amount estimating means is determined on the basis of a map showing an intake air amount according to the throttle opening, and the third intake air amount estimated by the second air amount estimating means is determined on the basis of a map showing an intake air amount according to the engine torque.

3. A failure diagnostic apparatus according to claim 1 wherein the first intake air amount detected by the intake air amount detecting means and the second air amount estimated by the first air amount estimating means are filtered by filter means to be delayed.

4. A failure diagnostic apparatus according to claim 1 wherein the failure judging means judges a failure in any one of the intake air amount detecting means, the throttle opening detecting means and the engine torque detecting means showing an air amount removed from the other two air amounts and is larger than a predetermined allowed range.

5. A failure diagnostic apparatus according to claim 1 wherein the failure judging means comprises:

averaging means for averaging the values of two intake air amounts having the closest values to each other among the first, second and third air amounts;

comparing means for dividing a value of the remaining intake air amount which is removed from the other two intake air amounts by the averaged value determined by the averaging means, subtracting the divided value from 1, and comparing the subtracted value with a predetermined value; and judging means for judging a failure in the detecting means showing the remaining intake air amount when the subtracted value determined by the comparing means is larger than the predetermined value.

6. A failure diagnostic apparatus according to claim 5 wherein the failure judging means judges a failure in the detecting means showing the remaining intake air amount when the subtracted value determined by the comparing means is larger than the predetermined value and continues for a predetermined period.

* * * * *